(12) United States Patent
Igarashi et al.

(10) Patent No.: US 9,075,400 B2
(45) Date of Patent: Jul. 7, 2015

(54) MOTOR CONTROL DEVICE

(75) Inventors: Yuji Igarashi, Tokyo (JP); Hidetoshi Ikeda, Tokyo (JP); Hiroto Takei, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 182 days.

(21) Appl. No.: 13/884,295

(22) PCT Filed: Dec. 16, 2011

(86) PCT No.: PCT/JP2011/079216
§ 371 (c)(1),
(2), (4) Date: May 9, 2013

(87) PCT Pub. No.: WO2012/086550
PCT Pub. Date: Jun. 28, 2012

(65) Prior Publication Data
US 2013/0234642 A1 Sep. 12, 2013

(30) Foreign Application Priority Data
Dec. 20, 2010 (JP) .................. 2010-283550

(51) Int. Cl.
*G05B 5/01* (2006.01)
*H02P 29/00* (2006.01)
(Continued)

(52) U.S. Cl.
CPC .............. *G05B 5/01* (2013.01); *H02P 29/0038* (2013.01); *H02P 23/0004* (2013.01);
(Continued)

(58) Field of Classification Search
CPC .............. G05B 5/01; H01H 3/60; G05G 25/02
USPC .................. 318/621, 623, 629, 632
See application file for complete search history.

(56) References Cited

U.S. PATENT DOCUMENTS 7,911,172 B2 * 3/2011 Ikeda et al. ............... 318/621
7,969,113 B2 * 6/2011 Ide ............................. 318/611
(Continued)

FOREIGN PATENT DOCUMENTS

CN    1448816 A    10/2003
JP    10 56790    2/1998
(Continued)

OTHER PUBLICATIONS

Combined Office Action and Search Report issued Jan. 16, 2014 in Taiwanese Patent Application No. 100147330 with English language translation and English Translation of Category of Cited Documents.
(Continued)

*Primary Examiner* — Bentsu Ro
(74) *Attorney, Agent, or Firm* — Oblon, McClelland, Maier & Neustadt, L.L.P.

(57) ABSTRACT

A motor control device that controls motion of a control target including a motor and a vibratable element includes a generating unit configured to generate, according to state information representing a state of the control target related to a vibration characteristic of the control target, a first parameter representing the vibration characteristic of the control target, a first calculating unit configured to calculate a second parameter corresponding to a temporal change amount of the first parameter generated by the generating unit, a second calculating unit configured to calculate, using a motion target value, the first parameter, and the second parameter, model torque such that the control target does not excite vibration, and a developing unit configured to develop, according to the model torque calculated by the second calculating unit, a torque command such that the motion of the control target follows the motion target value.

14 Claims, 10 Drawing Sheets

(51) Int. Cl.
  *H02P 23/00* (2006.01)
  *B25J 9/16* (2006.01)
(52) U.S. Cl.
  CPC .... *B25J 9/1641* (2013.01); *G05B 2219/39186* (2013.01); *G05B 2219/39195* (2013.01); *G05B 2219/41128* (2013.01); *G05B 2219/41166* (2013.01); *G05B 2219/41233* (2013.01); *G05B 2219/42077* (2013.01)

(56) References Cited

U.S. PATENT DOCUMENTS

| | | | |
|---|---|---|---|
| 8,005,598 | B2 | 8/2011 | Terashima et al. |
| 8,267,220 | B2 * | 9/2012 | Sugiyama et al. ............ 180/446 |
| 8,508,171 | B2 * | 8/2013 | Miyaji .......................... 318/560 |
| 2013/0038265 | A1 | 2/2013 | Igarashi et al. |

FOREIGN PATENT DOCUMENTS

| | | |
|---|---|---|
| JP | 2001-249270 A | 9/2001 |
| JP | 2001 249720 | 9/2001 |
| JP | 2005-38311 A | 2/2005 |
| JP | 2005 39954 | 2/2005 |
| JP | 4020726 | 12/2007 |
| JP | 4023749 | 12/2007 |
| JP | 2009 118684 | 5/2009 |
| JP | 4367041 | 11/2009 |
| WO | 2005 012155 | 2/2005 |

OTHER PUBLICATIONS

International Search Report Issued Mar. 19, 2012 in PCT/JP11/79216 Filed Dec. 16, 2011.
Office Action issued Feb. 15, 2015, in Chinese Patent Application No. 201180060892.9 (with Partial English-language Translation).

* cited by examiner

| VALUE OF ML (z-AXIS ARM LENGTH) | RESONANT FREQUENCY [Hz] | ANTI-RESONANT FREQUENCY [Hz] |
|---|---|---|
| 0 | 4.5 | 3.8 |
| 0.1 | 4.5 | 3.8 |
| ⋮ | ⋮ | ⋮ |
| 2.5 | 2.1 | 1.6 |

MOTOR CONTROL DEVICE

FIELD

The present invention relates to a motor control device.

BACKGROUND

In an industrial machine with low rigidity, when positioning driving for the industrial machine is performed by a motor, residual vibration sometimes occurs during a stop because of machine resonance or the like. To suppress such residual vibration, a motor control device that actuates the industrial machine via the motor calculates a control signal to reduce a signal component of a vibration frequency (a resonant frequency) of the industrial machine according to a motion target value and performs damping control for the industrial machine. For the motor control device to perform the damping control, a damping parameter for the damping control corresponding to a vibration frequency of a control system including the industrial machine is necessary. For an industrial machine, a vibration frequency of which does not change during motion, if a fixed damping parameter is set in the motor control device, it is possible to sufficiently suppress residual vibration.

On the other hand, among industrial machines, there are industrial machines, vibration frequencies of which change during motion, such as a Cartesian coordinate robot and a crane. For such industrial machines, even if a fixed damping parameter is set in the motor control device, there is a tendency that residual vibration cannot be suppressed.

To solve the problem, Patent Literature 1 describes a machine control device capable of moving an arm in an x-axis direction with a motor for the x-axis and moving a heavy object at an arm distal end in a z-axis direction with a motor for the z-axis. The machine control device changes a parameter (a gain constant) according to a changing vibration frequency of a control target including the arm and the heavy object. Specifically, a data table for control obtains position information concerning a distance from a slide section to the heavy object at the arm distal end and outputs output data related to a correction amount of the vibration frequency. A correction block multiplies a second-order differential value of a position command value with a parameter (a gain constant) obtained from the output data of the data table for control to calculate a correction amount and outputs the correction amount to the adder. The adder adds the correction amount to the original position command. Consequently, according to Patent Literature 1, because the machine control device performs correction taking into account a change in the vibration frequency or the like corresponding to the present position of a part of moving constituent members in the control target, it is possible to stop the control target moved to a predetermined position without vibrating the control target.

Patent Literature 2 describes a control system of a driving device for a crane including a rope engaged with a load to hang the load and a hoisting drum for winding up and winding down the rope. The control system performs feed-forward control to prevent a swing of load from occurring from a signal of rope length. Specifically, the control system detects rope length, sequentially calculates a resonant frequency of the rope from a detection result of the rope length, removes a component of the resonant frequency from a conveyance command limited not to exceed performance of the driving device, and inputs the conveyance command to the driving device for the crane. Consequently, according to Patent Literature 2, it is possible to drive and control the driving device for the crane to prevent the load from greatly swinging at a point when the load is conveyed.

CITATION LIST

Patent Literature

Patent Literature 1: Japanese Patent No. 4367041
Patent Literature 2: WO05/012155

SUMMARY

Technical Problem

In the machine control device described in Patent Literature 1, there is disclosed a command generating method for outputting a parameter (a gain constant), which changes according to a vibration frequency, from position information concerning a distance from the slide section to the heavy object at the arm distal end, calculating a correction amount as a product of a second-order differential value of a position command and the parameter (the gain constant), and adding the calculated correction amount to the position command to prevent vibration from being excited in a control target, a machine natural frequency of which changes during motion. However, there is a problem in that, even if the parameter (the gain constant) is changed to accurately correspond to the changing machine natural frequency, a damping suppression effect is sometimes not sufficiently obtained.

In the control system described in Patent Literature 2, to prevent a swing of load from occurring, the component of the resonant frequency is only removed from the conveyance command. Therefore, it is likely that the vibration suppression effect cannot be sufficiently obtained. Moreover, in the driving device for the crane, there is a problem in that the vibration suppression effect is not sufficiently obtained simply by removing a signal near the resonant frequency that changes according to the rope length. Further, in the control system described in Patent Literature 2, a filter coefficient is considered to be repeatedly calculated and determined by a simulation. Therefore, it is difficult to determine the coefficient and there is a tendency that the determination of the coefficient takes time.

The present invention has been devised in view of the above and it is an object of the present invention to obtain a motor control device that can further improve a vibration suppression effect in actuating a control target, a vibration characteristic of which changes during motion.

Solution to Problem

To solve the problems and attain the object, there is provided a motor control device that controls motion of a control target including a motor and a vibratable element, the motor control device comprising: a generating unit configured to generate, according to state information representing a state of the control target related to a vibration characteristic of the control target, a first parameter representing the vibration characteristic of the control target; a first calculating unit configured to calculate a second parameter corresponding to a temporal change amount of the first parameter generated by the generating unit; a second calculating unit configured to calculate, according to a motion target value, the first parameter, and the second parameter, a model torque such that the control target does not excite vibration; and a developing unit configured to develop, according to the model torque calculated by the second calculating unit, a torque command for the motor for causing the motion of the control target to follow the motion target value.

Advantageous Effects of Invention

According to the present invention, the model torque is calculated using not only the first parameter but also the second parameter corresponding to the temporal change amount of the first parameter. Therefore, it is possible to generate the torque command taking into account not only the vibration characteristic but also a rate of change of the vibration characteristic. Consequently, it is possible to further improve the vibration suppression effect in actuating a control target, a vibration characteristic of which changes during motion.

DESCRIPTION OF EMBODIMENTS

Embodiments of a motor control device according to the present invention are explained in detail based on the drawings. The present invention is not limited by the embodiments.

First Embodiment

Figure 1:
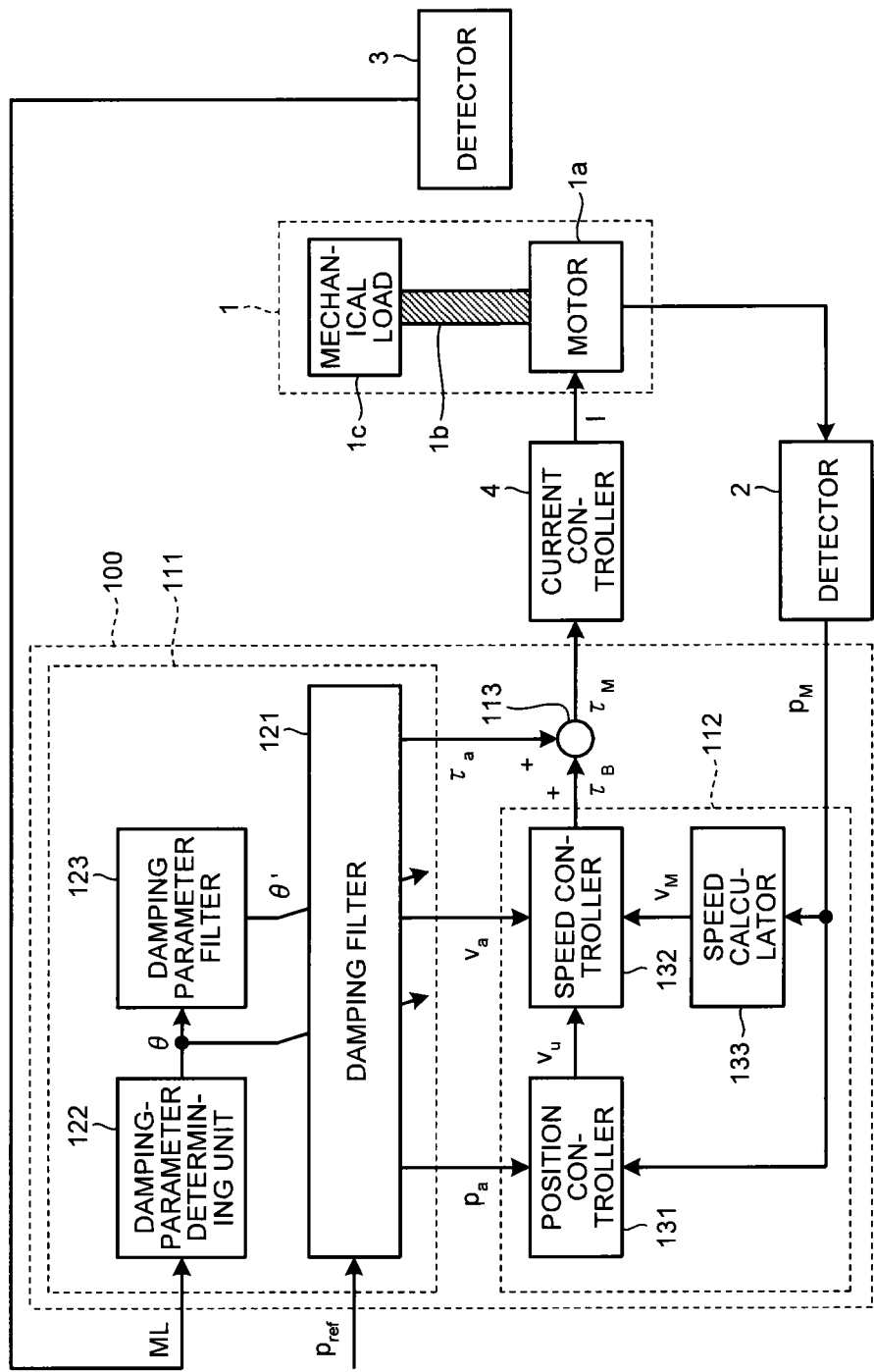
FIG. 1 is a diagram of the configuration of a motor control device according to a first embodiment.

The configuration of a motor control device 100 according to a first embodiment is explained with reference to FIG. 1. FIG. 1 is a block diagram of the configuration of the motor control device 100 according to the first embodiment.

The motor control device 100 receives, from the outside (e.g., a not-shown host controller), a motion target value (a position command) $p_{ref}$ representing a position target value of a control target 1 to be driven and receives, from a detector 2 (e.g., an encoder), a motor motion detection value $p_M$ representing a position of a motor 1a (e.g., a rotating position of a rotor or a driving position of a needle in the motor 1a) detected by the detector 2. Further, the motor control device 100 receives, from a detector 3, a parameter change signal (state information) ML representing a state of the control target 1 related to a vibration characteristic of the control target 1. The motor control device 100 performs an operation corresponding to the parameter change signal ML, develops a torque command $\tau_M$ such that the motor motion detection value $p_M$ follows the motion target value $p_{ref}$, and outputs the torque command $\tau_M$ to a current controller 4. Consequently, the current controller 4 supplies (electric power depending on) an electric current I corresponding to the torque command $\tau_M$ to the motor 1a present on the inside of the control target 1. Therefore, the motor 1a generates motor torque corresponding to the torque command $\tau_M$ and actuates a spring (the vibratable element) 1b and a mechanical load 1c present on the inside of the control target 1.

Specifically, the motor control device 100 includes a feed-forward control unit 111, a feedback control unit 112, and a torque adder (developing unit) 113.

The feed-forward control unit 111 receives the motion target value $p_{ref}$ from the outside and receives the parameter change signal ML from the detector 3. The detector 3 is, for example, an arm length detector. The detector 3 detects the length of a z-axis arm 1b1 (see FIG. 3) as the parameter change signal ML. The detector 3 is, for example, a rope length detector. The detector 3 detects the length of a rope 1b2 (see FIG. 4) as the parameter change signal ML. The feed-forward control unit 111 outputs a model position $p_a$ and model speed $v_a$ corresponding to an ideal motion waveform of the control target 1 to the feedback control unit 112 and outputs model torque $\tau_a$ to the torque adder 113.

The feedback control unit 112 receives the model position $p_a$ and the model speed $v_a$ output from the feed-forward control unit 111, receives the motor motion detection value $p_M$ of the control target 1 (the motor 1a) fed back from the detector 2, and outputs feedback torque $\tau_B$ to the torque adder 113.

The torque adder 113 develops a sum of the feedback torque $\tau_B$ and the model torque $\tau_a$ as the torque command $\tau_M$ and outputs the torque command $\tau_M$ to the current controller 4. The current controller 4 receives the torque command $\tau_M$ output from the torque adder 113 and applies (supplies), to the motor 1a, (electric power depending on) an actual current I for realizing motor torque that coincides with the torque command $\tau_M$. The actual current I output from the current controller 4 is fed to the motor 1a, whereby the spring (the vibratable element) 1b and the mechanical load 1c in the control target 1 are driven. The motor motion detection value $p_M$ of the motor 1a in the control target 1 is detected by the detector 2.

An overview of an internal configuration of the feed-forward control unit 111 is explained. The feed-forward control unit 111 includes a damping-parameter determining unit 122, a damping parameter filter (a first calculating unit) 123, and a damping filter (a second calculating unit) 121.

The damping-parameter determining unit 122 receives the parameter change signal ML and generates a damping parameter signal θ. That is, the damping-parameter determining unit 122 generates, based on the parameter change signal ML, the damping parameter signal (a first parameter) θ representing a present vibration characteristic of the control target 1 and outputs the damping parameter signal θ to the damping filter 121 and the damping parameter filter 123.

The damping parameter filter 123 receives the damping parameter signal θ and calculates a damping parameter variation signal θ'. That is, the damping parameter filter 123 receives the damping parameter signal θ from the damping-parameter determining unit 122, calculates the damping parameter variation signal (a second parameter) θ' representing a vibration characteristic change of the control target 1, i.e., corresponding to a temporal change amount of the damping parameter signal θ, and outputs a result of the calculation to the damping filter 121.

The damping filter 121 calculates the model position $p_a$, the model speed $v_a$, and the model torque $\tau_a$ not to excite vibration and to cause the control target 1 to steadily follow the motion target value $p_{ref}$ and outputs the model position $p_a$, the model speed $v_a$, and the model torque $\tau_a$.

Specifically, the damping filter 121 receives the motion target value $p_{ref}$ from the outside, receives the damping parameter signal θ from the damping-parameter determining unit 122, and receives the damping parameter variation signal θ' from the damping parameter filter 123. The damping filter 121 sequentially changes a characteristic thereof according to the damping parameter signal θ and the damping parameter variation signal θ'. The damping filter 121 calculates, with respect to fluctuation in the motion target value $p_{ref}$, the model position $p_a$, the model speed $v_a$, and the model torque $\tau_a$ not to excite vibration and such that the model position $p_a$ steadily coincides with the motion target value $p_{ref}$, the model speed $v_a$ steadily coincides a first-order differential value $p^{(1)}_{ref}$ of the motion target value, and the model torque $\tau_a$ steadily coincides with a value obtained by multiplying a second-order differential value $p^{(2)}_{ref}$ of the motion target value with the moment of inertia of the control target 1.

Note that $p^{(1)}_{ref}$ represents first-order differential concerning time of $p_{ref}$, $p^{(2)}_{ref}$ represents second-order differential concerning time of $p_{ref}$, and a numerical value in the parentheses on the upper right of each of the signs represents the number of times of differential concerning time.

The damping filter 121 outputs the model position $p_a$ and the model speed $v_a$ to the feedback control unit 112 and outputs the model torque $\tau_a$ to the torque adder 113. A method of calculating the model position $p_a$, the model speed $v_a$, and the model torque $\tau_a$ is explained below.

An internal configuration of the feedback control unit 112 is explained. The feedback control unit 112 includes a position controller 131, a speed calculator 133, and a speed controller 132.

The position controller 131 receives the model position $p_a$ output from the feed-forward control unit 111 and receives the motor motion detection value $p_M$ fed back from the detector 2. The position controller 131 calculates a speed command $v_u$ such that the motor motion detection value $p_M$ follows the model position $p_a$. The position controller 131 outputs the calculated speed command $v_u$ to the speed controller 132. For example, in the case of proportional control, the position controller 131 performs a calculation of Formula (1) with a position proportional gain set as $K_p$ and outputs a result of the calculation as the speed command $v_u$.

$$v_u = K_p \times (p_a - p_M) \quad (1)$$

The speed calculator 133 receives the motor motion detection value $p_M$ detected by the detector 2. The speed calculator 133 applies differential, filter processing, or the like to the received motor motion detection value $p_M$ and calculates a motor speed calculation value $v_M$. The speed calculator 133 outputs the calculated motor speed calculation value $v_M$ to the speed controller 132.

The speed controller 132 receives the model speed $v_a$ output from the feed-forward control unit 111, receives the speed command $v_u$ output from the position controller 131, and receives the motor speed calculation value $v_M$ output from the speed calculator 133. The speed controller 132 calculates the feedback torque $\tau_B$ through an arithmetic operation such as speed PI control to cause the motor speed calculation value $v_M$ to follow the model speed $v_a$, i.e., such that the motor speed calculation value $v_M$ coincides with a sum of the model speed $v_a$ and the model command $v_u$. The speed controller 132 outputs the calculated feedback torque $\tau_B$ to the torque adder 113. As an example of calculation processing in the speed controller 132, there is a combination of PI control and a filter as indicated by Formula (2). In Formula (2), s represents a Laplacian operator, $K_v$ represents a speed proportional gain, and $K_i$ represents a speed integral gain. A filter H(s) removes a predetermined frequency component at a frequency higher than a control band determined by the speed proportional gain and the speed integral gain of the speed controller 132. A filter called low-pass filter or notch filter is used as the filter H(s).

$$\tau_B = H(s) \times K_v \times ((s+K_i)/s) \times (v_u + v_a - v_M) \quad (2)$$

Accordingly, the torque adder 113 adds up the feedback torque $\tau_B$ calculated by the feedback control unit 112 and the model torque $\tau_a$ calculated by the feed-forward control unit 111 and calculates the torque command $\tau_M$. The torque adder 113 outputs the torque command $\tau_M$ to the current controller 4. Consequently, the current controller 4 drives the motor 1a present in the control target 1 to cause the motor motion detection value $p_M$ to follow the motion target value $p_{ref}$ and cause the control target 1 to perform desired motion.

Figure 2:
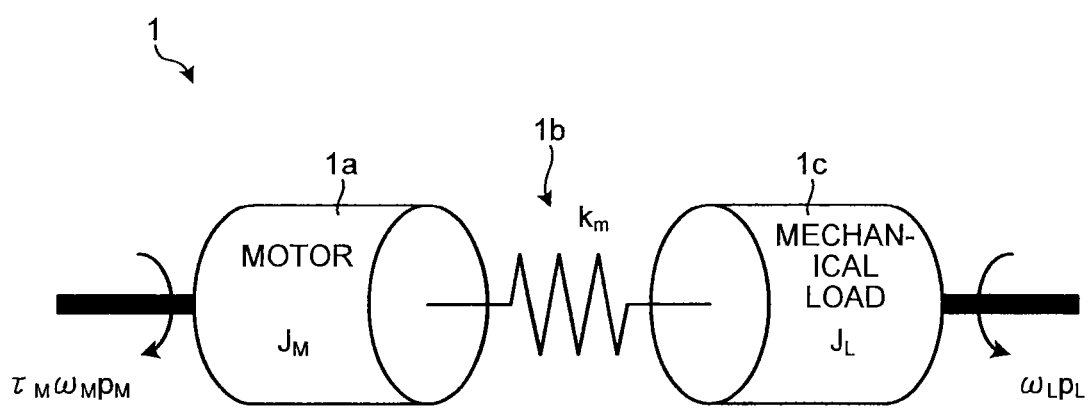
FIG. 2 is a diagram of a control target in the first embodiment.

An operation of the damping filter 121 (a method of calculating the model position $p_a$, the model speed $v_a$, and the model torque $\tau_a$) is explained in detail. In the explanation in this embodiment, as shown in FIG. 2, it is assumed that characteristics (a mechanical position characteristic and a mechanical speed characteristic) of the control target 1 can be represented by a two-inertia system model in which the motor 1a drives the mechanical load 1c via the spring (the vibratable element) 1b. In this embodiment, it is assumed that a spring constant of the spring 1b changes during motion. An equation of motion of the two-inertia model shown in FIG. 2 can be represented by Formulas (3) and (4).

$$J_M \times p^{(2)}_M = -k_m \times (p_M - p_L) + \tau_M \quad (3)$$

$$J_L \times p^{(2)}_L = k_m \times (p_M - p_L) \quad (4)$$

In Formulas (3) and (4), $p_M$ represents a motor position (e.g., a rotating position or the rotor or a driving position of the needle in the motor 1a), $v_M$ represents motor speed (e.g., rotating speed of the rotor or driving speed of the needle in the motor 1a), $p_L$ represents a mechanical position (the position of the mechanical load 1c), $J_M$ represents the moment of inertia of the motor 1a, $J_L$ represents the moment of inertia of the mechanical load 1c, $\tau_M$ represents motor torque (e.g., torque acting on the rotor or the needle in the motor 1a), and km represents a spring constant. In the following explanation, motor speed defined as $v_M := P^{(1)}_M$ and mechanical speed defined as $v_L := P^{(1)}_L$ are also used. In Formulas (3) and (4) and FIG. 1, the motor position is equivalent to the motor motion detection value, the motor speed is equivalent to the motor speed calculation value, and the motor torque is equivalent to the torque command. Therefore, in this embodiment, the motor position and the motor motion detection value, the motor speed and the motor speed calculation value, and the motor torque and the torque command are respectively represented as $p_M$, $v_M$, and $\tau_M$ using the same signs. In this embodiment, the spring constant $k_m$ is not a fixed value and changes during motion. Accordingly, a resonant frequency $\omega_p$ and an anti-resonant frequency $\omega_z$ of the two-inertia model represented by Formulas (5) and (6) also change during the motion.

$$\omega_p = \sqrt{(k_m \times (1/J_L + 1/J_M))} \quad (5)$$

$$\omega_z = \sqrt{(k_m / J_L)} \quad (6)$$

Figure 3A:
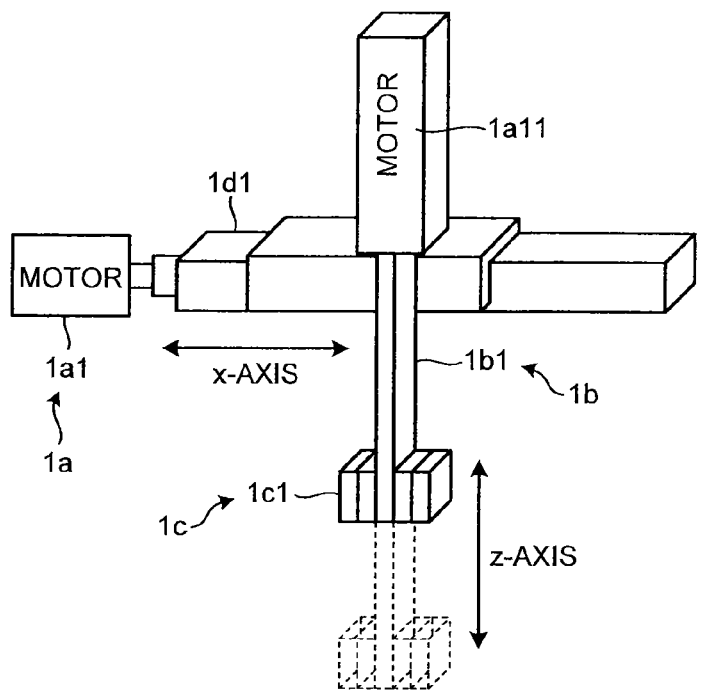
FIGS. 3A to 3C are diagrams of a control target in the first embodiment.
Figure 4:
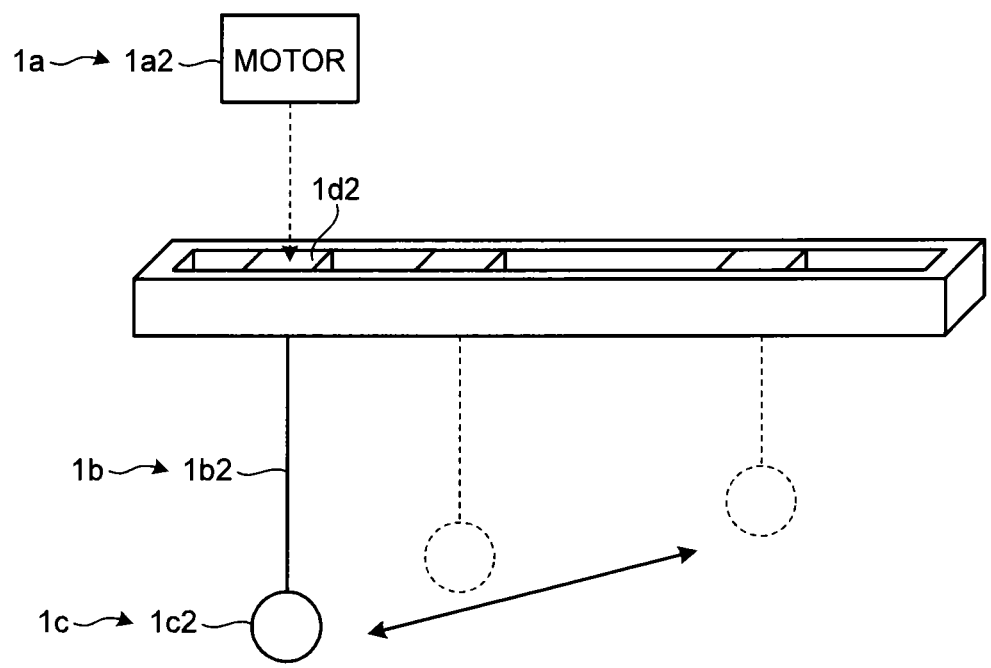
FIG. 4 is a diagram of a control target in the first embodiment.

Examples of a machine that can be modeled in such a two-inertia system, the spring constant $k_m$ of which changes during motion, include a Cartesian biaxial (x-y) robot in which the arm length of the z-axis arm 1b1 changes shown in FIG. 3(a) and a crane in which the rope length of the rope 1b2 changes shown in FIG. 4.

In the Cartesian biaxial (x-y) robot shown in FIG. 3A, two arms, i.e., the x-axis arm 1d1 and the z-axis arm 1b1 are respectively driven by an x-axis motor 1a1 and a z-axis motor 1a11. When the x-axis arm 1d1 is driven in the x-axis direction, the entire z-axis arm 1b1 moves in the x-axis direction. When the z-axis arm 1b1 is driven, a load 1c1 moves in the z-axis direction. In such a Cartesian biaxial robot, vibration occurs when the load 1c1 is driven at high speed in the x-axis direction. Diagrams representing a vibration characteristic of the Cartesian biaxial robot are board diagrams of FIGS. 3B and 3C. It is seen from the board diagrams of FIGS. 3B and 3C that, in both the short z-axis arm 1b1 and the long z-axis arm 1b1, there is a resonance characteristic in which a gain characteristic is a peak and an anti-resonance characteristic in which a gain characteristic is a valley. It is already well-known that the resonance characteristic and the anti-resonance characteristic are represented using a two-inertia system model represented by Formulas (3) and (4). In the board diagrams of FIGS. 3B and 3C, a gain characteristic in the x-axis direction in the case of the short z-axis arm 1b1 is indicated by a broken line and a gain characteristic in the x-axis direction in the case of the long z-axis arm 1b1 is indicated by a solid line.

Figure 3B:
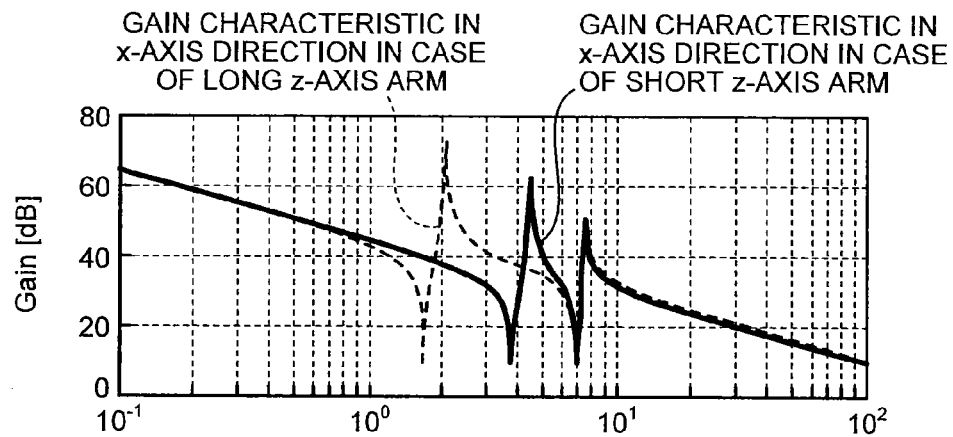
Figure 3C:
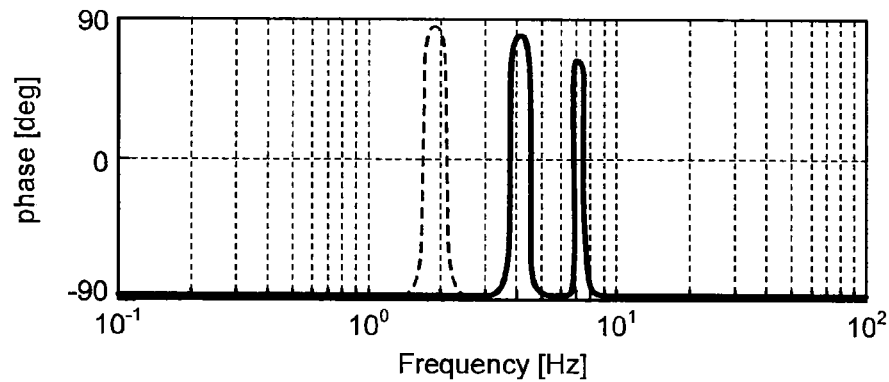

In the case of the Cartesian biaxial robot, as shown in the board diagrams of FIGS. 3B and 3C, a vibration frequency at the time when the load 1c1 is driven in the x-axis direction depends on the arm length in the z-axis direction. In the case of the characteristics shown in FIGS. 3B and 3C, when the arm length of the z-axis arm 1b1 is large, the vibration frequency by the load 1c1 driven in the x-axis direction is low. When the arm length of the z-axis arm 1b1 is small, the vibration frequency by the load 1c1 driven in the x-axis direction is high. That is, when both of the x-axis arm 1d1 and the z-axis arm 1b1 are simultaneously driven, the vibration characteristics (the resonance and anti-resonance characteristics) by the load 1c1 change with time. When the resonance and anti-resonance characteristics change with time, a characteristic of the Cartesian biaxial robot can be represented using the two-inertia system model, the spring constant $k_m$ of which changes with time, represented by Formulas (3) and (4).

In the case of the crane in which the rope length changes shown in FIG. 4, a slider 1d2 is driven by a motor 1a2, whereby a load 1c2 moves in the horizontal direction via the rope 1b2. The load 1c2 moves in the vertical direction according to winding-up and winding-down of the rope 1b2. In this case, the driving in the horizontal direction by the slider 1d2 corresponds to the driving of the x-axis arm 1d1 in the Cartesian biaxial robot. The winding-up and the winding-down of the rope 1b2 correspond to the driving of the z-axis arm 1b1. That is, a vibration frequency of the load 1c2 at the time when the slider 1d2 is driven is different depending on the length of the rope 1b2. Although the vibration frequency is different depending on the length of the rope 1b2 in this way, even in this case, a characteristic of the crane can be represented by the two-inertia system model, the spring constant $k_m$ of which changes with time, represented by Formulas (3) and (4).

The control targets explained above are examples of the control target 1. The control target 1 can be any control target as long as the control target can be represented by the two-inertial system model shown in FIG. 2. An equation of motion and a dynamic characteristic of the control target 1 are not limited to those represented by Formulas (3) and (4).

Figure 5:
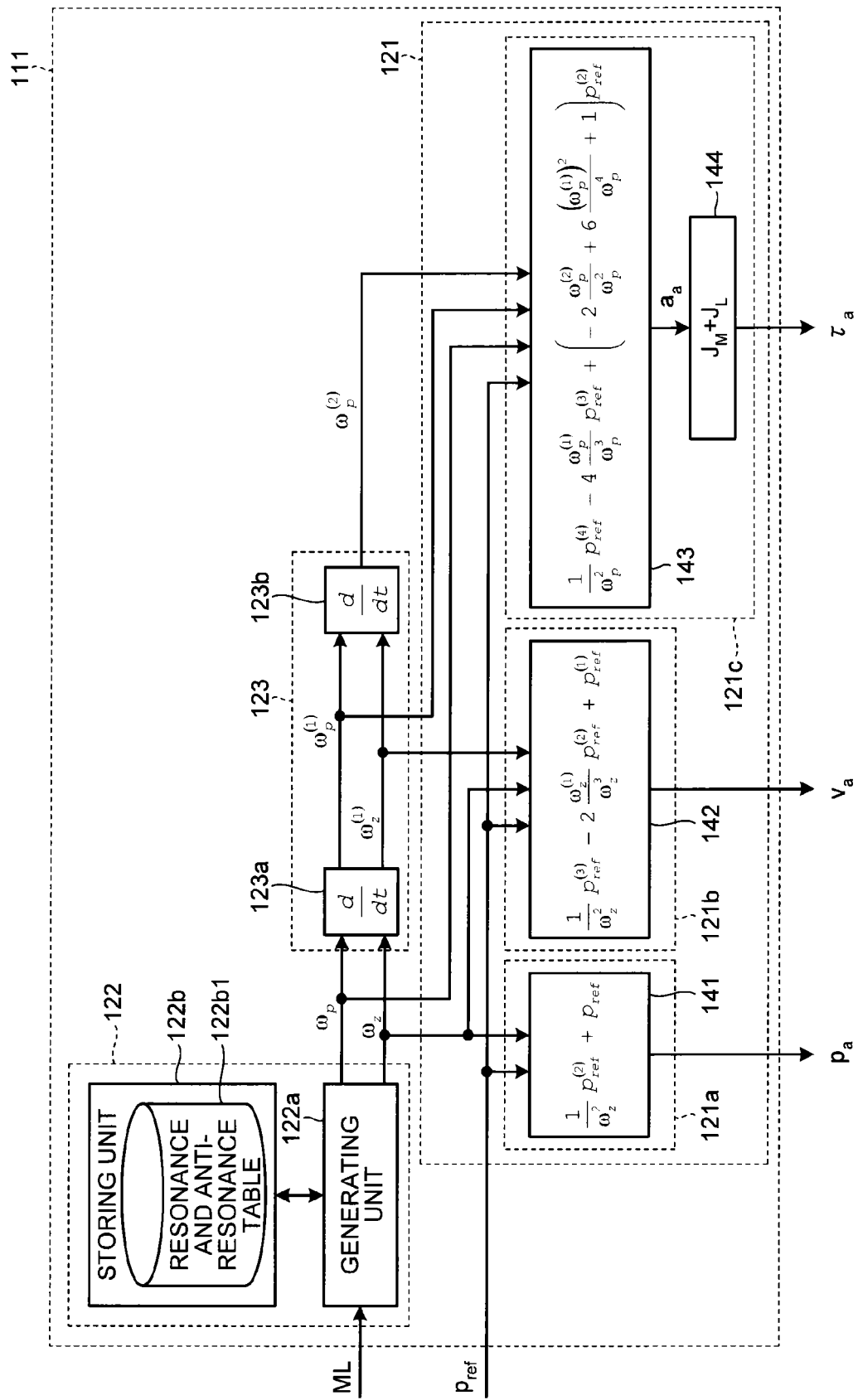
FIG. 5 is a diagram of the configuration of a feed-forward control unit in the first embodiment.

Details of the internal configuration of the feed-forward control unit 111 are explained with reference to FIG. 5. FIG. 5 is a block diagram of the internal configuration of the feed-forward control unit 111.

The damping-parameter determining unit 122 includes a generating unit 122a. The generating unit 122a receives the parameter change signal (the state information) ML representing the present state of the control target 1 related to the vibration characteristic of the control target 1. The parameter change signal ML includes, for example, the length (arm length) of the z-axis arm 1b1 corresponding to a rotating position (for determining the position of the load) of the z-axis motor 1a11 in the Cartesian biaxial (x-y) robot in which the arm length changes shown in FIG. 3. Alternatively, the parameter change signal ML includes, for example, the length (rope length) of the rope 1b2 in the crane shown in FIG. 4. The generating unit 122a generates, according to the parameter change signal ML, the damping parameter signal (the first parameter) θ representing the (present) vibration characteristic of the control target 1 and outputs the damping parameter signal θ to the damping parameter filter 123 and the damping filter 121. The damping parameter signal θ includes, for example, the resonant frequency $\omega_p$ and the anti-resonant frequency $\omega_z$. The damping parameter signal θ can further include a load inertia moment, the spring constant $k_m$, and the rope length.

Figures 6, 7:
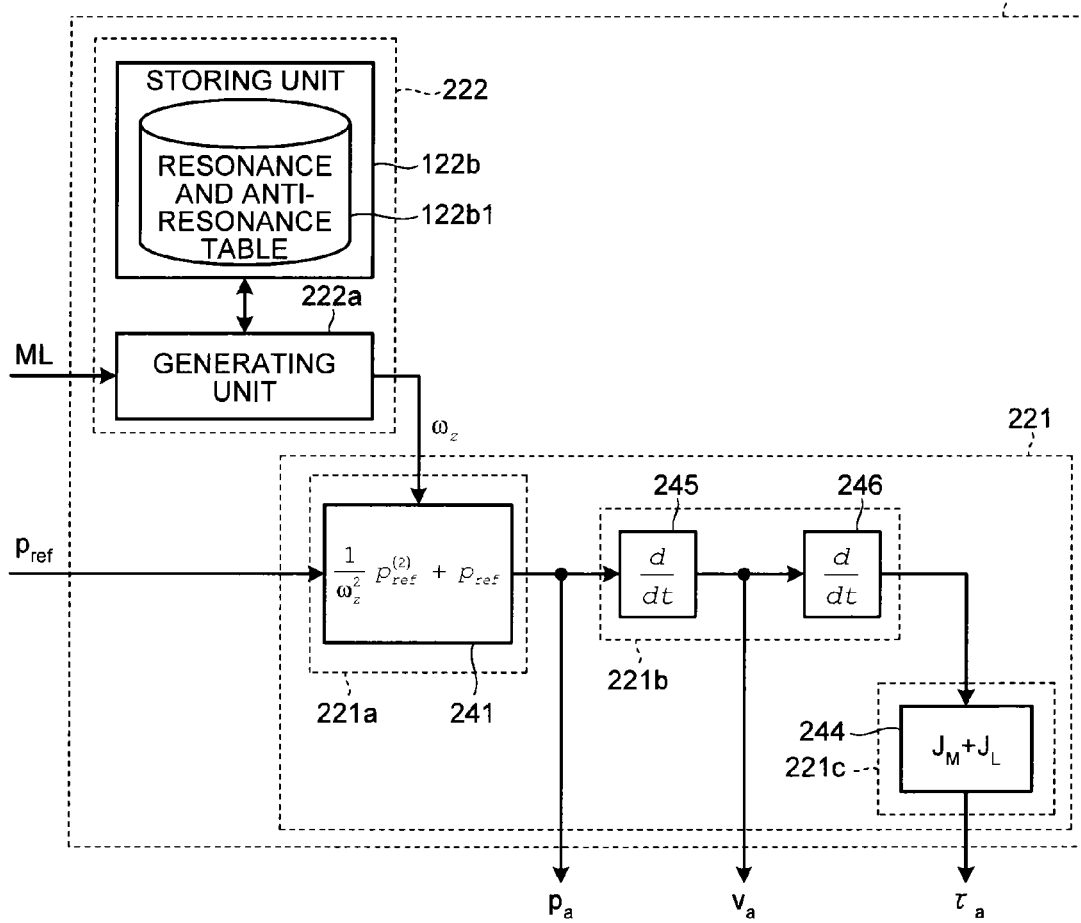
FIG. 6 is a diagram of the configuration of a resonance and anti-resonance table in the first embodiment.
FIG. 7 is a diagram of the configuration of a feed-forward control unit in a second embodiment.

The damping-parameter determining unit 122 can further include a storing unit 122b. The storing unit 122b stores a resonance and anti-resonance table 122b1 in which a plurality of values of the parameter change signal ML and a plurality of values of the damping parameter signal θ are associated. For example, correspondence between the values of the parameter change signal ML and the values of the damping parameter signal θ can be experimentally calculated in advance and stored in the storing unit 122b as the resonance and anti-resonance table 122b1 in advance. The resonance and anti-resonance table 122b1 are, for example, as shown in FIG. 6, a table in which a plurality of the parameter change signals (arm lengths) ML, a plurality of the resonant frequencies $\omega_p$, and a plurality of the anti-resonant frequencies $\omega_z$ are associated. In this case, the generating unit 122a determines and generates, by sequentially referring to the resonance and anti-resonance table 122b1 stored in the storing unit 122b, the damping parameter signal θ, i.e., the resonant frequency $\omega_p$ and the anti-resonant frequency $\omega_z$ corresponding to the parameter change signal (the arm length) ML received from the detector 3 (see FIG. 1).

The storing unit 122b can store, instead of the resonance and anti-resonance table 122b1, a function indicating a relation between a value of the parameter change signal ML and a value of the damping parameter signal θ. In this case, the generating unit 122a determines and generates, by sequentially referring to the function stored in the storing unit 122b, the damping parameter signal θ, i.e., the resonant frequency $\omega_p$ and the anti-resonant frequency $\omega_z$ corresponding to the parameter change signal (the arm length) ML received from the detector 3 (see FIG. 1).

The damping parameter filter (the first calculating unit) 123 receives the damping parameter signal θ, i.e., the resonant frequency $\omega_p$ and the anti-resonant frequency $\omega_z$ from the damping-parameter determining unit 122. The damping parameter filter 123 calculates the damping parameter variation signal (the second parameter) θ' corresponding to a temporal change amount of the damping parameter signal θ. The damping parameter variation signal θ' is an amount calculated to be equivalent to the temporal change amount of the damping parameter signal θ and represents a vibration characteristic change of the control target 1. For example, the damping parameter variation change signal θ' is calculated by applying differential, difference processing, a differential+averaging filter, a high-pass filter, or the like to the damping parameter signal θ. When the damping parameter signal θ is stored by the resonance and anti-resonance table 122b1, a variation amount of the damping parameter signal θ can be calculated in advance and the damping parameter variation signal θ' can be calculated from a product of the calculated variation amount and time differential.

For example, the damping parameter filter 123 includes a differentiator 123a and a differentiator 123b. The differentiator 123a receives the resonant frequency $\omega_p$ and the anti-resonant frequency $\omega_z$ from the generating unit 122a. The differentiator 123a temporally applies first-order differential to the resonant frequency $\omega_p$ and the anti-resonant frequency $\omega_z$ and outputs a result of the first-order differential to the differentiator 123b and the damping filter 121 as differential values $\omega^{(1)}_p$ and $\omega^{(1)}_z$. The differentiator 123b receives the differential values $\omega^{(1)}_p$ and $\omega^{(1)}_z$ from the differentiator 123a, further temporally applies the first-order differential to the differential value differential values $\omega^{(1)}_p$, and outputs a result of the first-order differential to the damping filter 121 as a second-order differential value $\omega^{(2)}_p$.

The damping filter 121 (the second calculating unit) includes a position calculating unit 121a, a speed calculating unit 121b, and a torque calculating unit 121c.

The position calculating unit 121a includes a model-position calculating unit 141. The model-position calculating unit 141 receives the motion target value $p_{ref}$ from the outside and receives the anti-resonant frequency $\omega_z$ from the damping-parameter determining unit 122. The model-position calculating unit 141 calculates, using the motion target value $p_{ref}$ and the anti-resonant frequency $\omega_z$, the model position $p_a$ as indicated by Formula (8) below and outputs the model position $p_a$ to the feedback control unit 112 (see FIG. 1).

The speed calculating unit 121b includes a model-speed calculating unit 142. The model-speed calculating unit 142 receives the motion target value $p_{ref}$ from the outside, receives the anti-resonant frequency $\omega_z$ from the generating unit 122a of the damping-parameter determining unit 122, and receives a first-order differential value $\omega^{(1)}_z$ of the anti-resonant frequency from the differentiator 123a of the damping parameter filter 123. The model-speed calculating unit 142 calculates, using the motion target value $p_{ref}$, the anti-resonant frequency $\omega_z$, and the first-order differential value $\omega^{(1)}_z$ of the anti-resonant frequency, the model speed $v_a$ as indicated by Formula (10) below and outputs the model speed $v_a$ to the feedback control unit 112 (see FIG. 1).

The torque calculating unit 121c includes a model-acceleration calculating unit 143 and an inertia-moment multiplying unit 144.

The model-acceleration calculating unit 143 receives the motion target value $p_{ref}$ from the outside and receives the anti-resonant frequency $\omega_z$ from the generating unit 122a of the damping-parameter determining unit 122. The model-acceleration calculating unit 143 receives the first-order differential value $\omega^{(1)}_z$ of the anti-resonant frequency from the differentiator 123a of the damping parameter filter 123 and receives the second-order differential value $\omega^{(2)}_p$ from the differentiator 123b of the damping parameter filter 123. The model-acceleration calculating unit 143 calculates, using the motion target value $p_{ref}$, the anti-resonant frequency $\omega_z$, the first-order differential value $\omega^{(1)}_z$, and the second-order differential value $\omega^{(2)}_p$, a model acceleration $a_a$ as indicated by Formula (13) below and outputs the model acceleration $a_a$ to the inertia-moment multiplying unit 144.

The inertia-moment multiplying unit 144 receives the model acceleration $a_a$ from the model-acceleration calculating unit 143. The inertia-moment multiplying unit 144 calculates, using the model acceleration $a_a$, the model torque $\tau_a$ as indicated by Formula (14) below and outputs the model torque $\tau_a$ to the torque adder 113 (see FIG. 1).

The resonant frequency $\omega_p$ and the anti-resonant frequency $\omega_z$ are equivalent to the damping parameter signal θ shown in FIG. 1. The first-order differential value $\omega^{(1)}_z$ and the second-order differential value $\omega^{(2)}_p$ of the resonant frequency and the first-order differential value $\omega^{(1)}_z$ of the anti-resonant frequency are equivalent to the damping parameter variation signal θ' shown in FIG. 1.

A specific operation on the inside of the damping filter 121 is explained.

The model-position calculating unit 141 of the damping filter 121 calculates, using the anti-resonant frequency $\omega_z$ (the damping parameter signal θ) and the motion target value $p_{ref}$, the motor position $p_M$ at the time when the motor 1a is actuated such that a mechanical position $p_L$ coincides with the motion target value $p_{ref}$. The model-position calculating unit 141 outputs a result of the calculation to the feedback control unit 112 (see FIG. 1) as the model position $p_a$. By causing the motor motion detection value $p_M$ to coincide with the model position $p_a$ calculated in this way, concerning the control target 1, the resonant and anti-resonant frequencies of which change during motion, it is possible to cause the mechanical position of the control target 1 to coincide with the motion target value $p_{ref}$. As a result, it is possible to suppress vibration. Because the model position $p_a$ is calculated to steadily coincide with the motion target value $p_{ref}$, it is easy to cause the motor motion detection value $p_M$ to follow the motion target value $p_{ref}$. Characteristics from the motor torque $\tau_M$ to the mechanical position $p_L$ represented by the two-inertia system model are explained in detail. The motor position $p_M$ at the time when the mechanical position $p_L$ is caused to coincide with the motion target value $p_{ref}$ can be calculated as follows from Formulas (4) and (6):

$$1/\omega_z^2 \times p^{(2)}_{ref} + p_{ref} = p_M \quad (7)$$

Therefore, the model-position calculating unit 141 calculates the model position $p_a$ using Formula (8) below. That is, the model position $p_a$ is a sum of a value obtained by multiplying the second-order differential value $p^{(2)}_{ref}$ of the motion target value with the reciprocal of the square of the anti-resonant frequency $\omega_z$ and the motion target value $p_{ref}$.

$$p_a = 1/\omega_z^2 \times p^{(2)}_{ref} + p_{ref} \quad (8)$$

To summarize, the model-position calculating unit 141 calculates the model position $p_a$ according to Formula (8) using the motion target value $p_{ref}$ and the anti-resonant frequency $\omega_z$ equivalent to the damping parameter θ and outputs the calculated model position $p_a$ to the feedback control unit 112.

The model-speed calculating unit 142 of the damping filter 121 calculates, according to Formula (4), using the anti-resonant frequency $\omega_z$ (the damping parameter signal θ) and the first-order differential value $\omega^{(1)}_z$ thereof (the damping parameter variation signal θ'), the motor speed $v_M$ at the time when the mechanical speed $v_L$ coincides with the first-order differential value $p^{(1)}_{ref}$ of the motion target value. The model-speed calculating unit 142 outputs a result of the calculation to the feedback control unit 112 as the model speed $v_a$. By causing the motor speed calculation value $v_M$ to follow the model speed $v_a$ calculated in this way, concerning the control target 1, the resonant and anti-resonant frequencies of which change during motion, it is possible to cause the mechanical speed in the control target 1 (the moving speed of the mechanical load 1c) to follow the first-order differential value $p^{(1)}_{ref}$ of the motion target value without a deviation. To explain actually using a formula, the motor speed $v_M$ at the time when the mechanical speed $v_L$ coincides with the first-order differential value $p^{(1)}_{ref}$ of the motion target value is calculated as follows by differentiating both sides of Formula (7) concerning time taking into account that the anti-resonant frequency $\omega_z$ also changes with time:

$$= p_M^{(1)} 1/\omega_z^2 \times p_{ref}^{(3)} + p_{ref}^{(1)} - 2 \times \omega_z^{(1)}/\omega_z^3 \times p_{ref}^{(2)} \quad (9)$$
$$= v_M$$

Therefore, the model-speed calculating unit 142 calculates the model speed $v_a$ using Formula (10) below. The model-speed calculating unit 142 outputs the calculated model speed $v_a$ to the feedback control unit 112. That is, the model-speed calculating unit 142 outputs, to the feedback control unit 112, as the model speed $v_a$, a value obtained by adding the first-order differential value $p^{(1)}_{ref}$ of the motion target value to a difference between a value obtained by multiplying a third-order differential value $p^{(3)}_{ref}$ of the motion target value with the reciprocal of the square of the anti-resonant frequency $\omega_z$ and a value obtained by multiplying, with the reciprocal of the cube of the anti-resonant frequency $\omega_z$, a value obtained by doubling a product of the second-order differential value $p^{(2)}_{ref}$ of the motion target value and the first-order differential value $\omega^{(1)}_z$ of the anti-resonant frequency.

$$v_a = 1/\omega_z^2 \times p^{(3)}_{ref} + p^{(1)}_{ref} - 2\omega^{(1)}_z/\omega_z^3 \times p^{(2)}_{ref} \quad (10)$$

In Formula (10), $\omega_z$ is a value obtained from the damping-parameter determining unit 122. $\omega^{(1)}_z$ is a value that the damping parameter filter 123 calculates by obtaining $\omega_z$ from the damping-parameter determining unit 122 and subjecting $\omega_z$ to arithmetic operation such as differential or difference processing and outputs to the damping filter 121. From Formula (10), it is seen that, to calculate the model speed $v_a$ equivalent to the motor speed $v_M$ such that the mechanical speed $V_L$ coincides with the first-order differential value $p^{(1)}_{ref}$ of the motion target value in the control target 1, the resonant frequency of which fluctuates, not only the anti-resonant frequency $\omega_z$ but also the first-order differential value $\omega^{(1)}_z$ of the anti-resonant frequency is necessary information.

The model-acceleration calculating unit 143 and the inertia-moment multiplying unit 144 calculates the model torque $\tau_a$ using the resonant frequency $\omega_p$ (the damping parameter signal $\theta$) and the first-order differential value $\omega^{(1)}_p$ and the second-order differential value $\omega^{(2)}_p$ (the damping parameter variation signal $\theta'$) of the resonant frequency $\omega_p$ to set a characteristic from the motion target value $p_{ref}$ to the model torque $\tau_a$ as an inverse characteristic of a characteristic from the motor torque $\tau_M$ to the mechanical position $p_L$. The inertia-moment multiplying unit 144 outputs the calculated model torque $\tau_a$ to the torque adder 113.

By calculating the model torque $\tau_a$ in this way, it is possible to cause the mechanical position of the control target 1 to follow the motion target value $p_{ref}$ without a deviation if there is no disturbance such as friction and a model error. As a result, it is also possible to suppress vibration. Operations of the model-acceleration calculating unit 143 and the inertia-moment multiplying unit 144 are explained using formulas.

First, calculations of first-order differential and second-order differential of both the sides of Formula (4) is performed taking into account that the resonant frequency $\omega_p$ also changes with time. The calculated formula and Formula (4) are substituted in Formula (3) to calculate a dynamic characteristic from the motor torque $\tau_M$ to the mechanical position $p_L$. Then, Formula (11) is obtained.

$$1/\omega_p^2 \times p^{(4)}_L - 4 \times \omega^{(1)}_p/\omega_p^3 \times p^{(3)}_L + (-2 \times \omega^{(2)}_p/\omega_p^2 + 6 \times (\omega^{(1)}_p)^2/\omega_p^4) \times p^{(2)}_L + p^{(2)}_L = 1/(J_M + J_L) \times \tau_M \quad (11)$$

From Formula (11), it is seen that, in the control target 1, the resonant frequency of which fluctuates, because the dynamic characteristic of the control target 1 is affected by not only the resonant frequency $\omega_p$ but also the first-order differential value $\omega^{(1)}_p$ and the second-order differential value $\omega^{(2)}_p$ of the resonant frequency, to completely compensate for the dynamic characteristic of the control target 1, not only the resonant frequency $\omega_p$ but also the first-order differential value $\omega^{(1)}_p$ and the second-order differential value $\omega^{(2)}_p$ are necessary information. If the characteristic from the motion target value $p_{ref}$ to the model torque $\tau_a$ is set as the inverse characteristic of the characteristic from the motor torque $\tau_M$ to the mechanical position $p_L$, it is possible to cause the mechanical position of the control target to follow the motion target value $p_{ref}$ without a deviation. Further, because the dynamic characteristic from the motor torque $\tau_M$ to the mechanical position $p_L$ is Formula (11), the model torque $\tau_M$ is calculated to be Formula (12).

$$\tau_a = (J_M + J_L) \times \{1/\omega_p^2 \times p^{(4)}_{ref} - 4 \times \omega^{(1)}_p/\omega_p^3 \times p^{(3)}_{ref} + (-2 \times \omega^{(2)}_p/\omega_p^2 + 6 \times (\omega^{(1)}_p)^2/\omega_p^4) \times p^{(2)}_{ref} + p^{(2)}_{ref}\} \quad (12)$$

Therefore, the model-acceleration calculating unit 143 calculates the model acceleration $a_a$ according to Formula (13) below using the motion target value $P_{ref}$, the resonant frequency $\omega_p$, and the first-order differential value $\omega^{(1)}_p$ and the second-order differential value $\omega^{(2)}_p$ of the resonant frequency $\omega_p$. The model-acceleration calculating unit 143 outputs the calculated model acceleration $a_a$ to the inertia-moment multiplying unit 144. The inertia-moment multiplying unit 144 calculates the model torque $\tau_a$ according to Formula (14) below using the model acceleration $a_a$. The inertia-moment multiplying unit 144 outputs the calculated model torque $\tau_a$ to the torque adder 113.

$$a_a = 1/\omega_p^2 \times p^{(4)}_{ref} - 4 \times \omega^{(1)}_p/\omega_p^3 \times p^{(3)}_{ref} + (-2 \times \omega^{(2)}_p/\omega_p^2 + 6 \times (\omega^{(1)}_p)^2/\omega_p^4) \times p^{(2)}_{ref} + p^{(2)}_{ref} \quad (13)$$

$$\tau a = (J_M + J_L) \times a_a \quad (14)$$

In Formula (13), $\omega_p$ is the damping parameter signal $\theta$ obtained from the damping-parameter determining unit 122. $\omega^{(1)}_p$ and $\omega^{(2)}_p$ are the damping parameter variation signal $\theta'$ that the damping parameter filter 123 calculates by obtaining $\omega$ from the damping-parameter determining unit 122 and outputs to the damping filter 121.

In this way, the model-acceleration calculating unit 143 calculates the model torque $\tau_a$ using Formula (13) and the inertia-moment multiplying unit 144 calculates the model torque $\tau_a$ using Formula (14). Consequently, when there is no disturbance such as friction and a model error, it is possible to cause the mechanical position $p_L$ to follow the motion target value $P_{ref}$ without a deviation.

As explained above, in the first embodiment, in the motor control device 100, the damping-parameter determining unit 122 and the damping parameter filter 123 change the characteristic of the feed-forward control unit 111 according to a vibration characteristic change of the control target 1. That is, the generating unit 122a of the damping-parameter determining unit 122 generates, according to the parameter change signal ML representing the (present) state of the control target 1 related to the vibration characteristic of the control target 1, the damping parameter signal $\theta$ representing the vibration characteristic of the control target 1. The damping parameter filter 123 calculates the damping parameter variation signal $\theta'$ corresponding to the temporal change amount of the damping parameter signal $\theta$ generated by the generating unit 122a. The damping filter 121 calculates, using the motion target value $p_{ref}$, the damping parameter signal $\theta$, and the damping parameter variation signal $\theta'$, the model torque $\tau_a$ such that the control target 1 does not excite vibration. That is, the damping parameter signal $\theta$ includes a vibration frequency of the control target 1 and the damping parameter variation signal $\theta'$ includes a temporal change amount of the vibration frequency of the control target 1. In this way, the model torque $\tau_a$ is calculated using not only the damping parameter signal (the vibration frequency) but also the damping parameter variation signal (the temporal change amount of the vibration frequency). Therefore, it is possible to perform the feedforward control taking into account not only the vibration characteristic but also the rate of change of the vibration characteristic. Consequently, concerning a control target, the vibration characteristic of which changes during motion, it is possible to realize high response and low vibration in the vibration suppression control. That is, it is possible to further improve the vibration suppress effect in causing the control target 1, the vibration characteristic of which changes during motion.

In the first embodiment, the damping filter 121 calculates, using the motion target value $p_{ref}$, the damping parameter signal $\theta$, and the damping parameter variation signal $\theta'$, the model speed $v_a$ not to vibrate the control target 1. The speed controller 132 develops the feedback torque $\tau_B$ such that the speed of the control target 1 follows the model speed $v_a$ calculated by the damping filter 121. Consequently, it is possible to obtain a high vibration suppression effect even in a state in which disturbance is applied to the control target 1, the vibration characteristic of which changes during motion.

Further, in the first embodiment, the damping filter 121 calculates, using the motion target value $p_{ref}$, the damping parameter signal $\theta$, and the damping parameter variation signal $\theta'$, the model position $p_a$ such that the control target 1 does not excite vibration. The position controller 131 develops the feedback torque $\tau_B$ such that the position of the control target 1 follows the model position $p_a$ calculated by the damping filter 121. Consequently, it is possible to obtain a high vibration suppression effect even in a state in which disturbance is applied to the control target 1, the vibration characteristic of which changes during motion.

Further, in the first embodiment, the damping parameter signal $\theta$ (the vibration frequency) used for the calculation by the damping filter 121 can be easily calculated or determined from the characteristic of the control target 1 (detected by the detector 3). Therefore, it is unnecessary to repeatedly perform a simulation in determining a coefficient (i.e., the damping parameter signal $\theta$) of the damping filter 121. It is possible to simply perform the determination of the damping parameter signal $\theta$ in a short time.

For example, the storing unit 122b of the damping-parameter determining unit 122 stores the resonance and anti-resonance table 122b1 in which a plurality of values of the parameter change signal ML and a plurality of values of the damping parameter signal $\theta$ are associated. The generating unit 122a generates, by referring to the resonance and anti-resonance table stored in the storing unit 122b, the damping parameter signal $\theta$ corresponding to the received parameter change signal ML. Consequently, it is easy to simply perform the determination of the damping parameter signal $\theta$ in a short time.

Alternatively, for example, the storing unit 122b of the damping-parameter determining unit 122 stores a function indicating a relation between a value of the parameter change signal ML and a value of the damping parameter signal $\theta$. The generating unit 122a generates, by referring to the function stored in the storing unit 122b, the damping parameter signal $\theta$ corresponding to the received parameter change signal ML. Consequently, it is easy to simply perform the determination of the damping parameter $\theta$ in a short time.

In the first embodiment, the damping parameter filter 123 calculates the damping parameter variation signal $\theta'$ by performing first-order differential and second-order differential of the damping parameter signal $\theta$. Consequently, it is possible to simply calculate the damping parameter variation signal $\theta'$ in a short time.

In the first embodiment, when the control target 1 is the Cartesian biaxial (x-y) robot shown in FIG. 3, the control target 1 includes a plurality of motors, i.e., the x-axis motor 1a1 and the z-axis motor 1a11. The parameter change signal ML received by the generating unit 122a of the damping-parameter determining unit 122 includes a state (arm length) of the z-axis arm (the vibratable element) 1b1 corresponding to the position (the rotating position) of the z-axis motor 1a11 not controlled by the motor control device 100 among the motors (the x-axis motor 1a1 and the z-axis motor 1a11). Consequently, while one motor in a control target including a plurality of motors is controlled, even if a vibration frequency of the control target changes according to the position of another motor, it is possible to improve accuracy in vibration suppression in actuating the control target 1.

In the first embodiment, the damping filter 121 calculates the model torque $\tau_a$ such that a characteristic from the motion target value $p_{ref}$ to the model torque $\tau_a$ is an inverse characteristic of a characteristic from the torque command (the motor torque $\tau_M$) to the position of the control target 1. Consequently, it is possible to cause the mechanical position of the control target 1 to follow the motion target value $p_{ref}$ without a deviation.

In the first embodiment, the damping filter 121 calculates, as the model speed $v_a$, the motor speed $v_m$ at the time when the speed of the control target 1 follows speed corresponding to the motion target value $p_{ref}$. Consequently, it is possible to cause the speed of the control target 1 to follow the model speed $v_a$ without a deviation.

In the first embodiment, the damping filter 121 estimates the motor position $p_M$ at the time when the position of the control target 1 follows a position corresponding to the motion target value $p_{ref}$ and calculates the motor position $p_M$ as the model position $p_a$. Consequently, it is possible to cause the mechanical position of the control target 1 to follow the motion target value $p_{ref}$ without a deviation.

In this embodiment, the two-inertia system model, the spring constant of which is variable, is used as the control target 1. However, this embodiment can be applied in control targets other than this control target. For example, the control target 1 can be a control target, an inertial moment of which changes during motion, and a control target in which attenuation of a damper or the like is present.

In this embodiment, the resonant frequency, the anti-resonant frequency, and the differential of the resonant frequency and the anti-resonant frequency are sequentially changed. However, a spring constant can be referred to in a table or the like and the resonant frequency and the anti-resonant frequency can be calculated based on a value of the spring constant and output to the damping filter 121.

In this embodiment, the parameter change signal ML is received from the outside of the motor control device 100 (i.e., from the detector 3) and the damping parameter signal $\theta$ and the damping parameter variation signal $\theta'$ are changed according to the parameter change signal ML. However, the motor control device 100 can receive the damping parameter signal θ from the outside. In this case, the motor control device 100 can calculate the damping parameter variation signal θ' according to the received damping parameter signal θ. Alternatively, the motor control device 100 can receive both of the damping parameter signal θ and the damping parameter variation signal θ' from the outside.

In this embodiment, the position controller 131 performs P control and the speed controller 132 performs PI control and a filter. However, these controllers can be controllers for PID control, H∞ control, μ control, adaptive control, sliding mode control, and the like.

Second Embodiment

A motor control device 200 according to a second embodiment is explained. In the following explanation, differences from the first embodiment are mainly explained.

A difference between the motor control device 200 according to this embodiment and the motor control device 100 according to the first embodiment resides in a processing content (a method of calculating a model position, model speed, and model torque) in a damping filter. That is, when the resonant frequency $\omega_p$ and the anti-resonant frequency $\omega_z$ are substantially equal ($\omega_p \equiv \omega_z$), the motor control device 200 generates a motion compensation signal (the model position $p_a$) obtained by removing a frequency component corresponding to the damping parameter signal θ from the motion target value $p_{ref}$ and performs first-order differential and second-order differential of the generated motion compensation signal to calculate the model speed $v_a$ and the model torque $\tau_a$.

Specifically, the motor control device 200 includes a feed-forward control unit 211 shown in FIG. 7. FIG. 7 is a block diagram of an internal configuration of the feed-forward control unit 211 in the second embodiment.

The feed-forward control unit 211 does not include the damping parameter filter 123 and includes a damping-parameter determining unit 222 and a damping filter 221.

The damping-parameter determining unit 222 includes a generating unit 222a. The generating unit 222a outputs the anti-resonant frequency $\omega_z$ to the damping filter 221 as a parameter change signal θ according to the parameter change signal ML but does not output the resonant frequency $\omega_p$. In this case, a table (a anti-resonance table) in which a column of a resonant frequency in the resonance and anti-resonance table 122b1 is omitted can be stored in the storing unit 122b of the damping-parameter determining unit 222.

The damping filter 221 includes a compensation-signal generating unit (a second generating unit) 221a, a change-amount calculating unit (a first calculating unit) 221b, and a torque calculating unit (a second calculating unit) 221c.

The compensation-signal generating unit 221a generates a motion compensation signal (the model position $p_a$) obtained by removing a frequency component corresponding to the parameter change signal θ (the anti-resonant frequency $\omega_z$) from the motion target value $p_{ref}$.

Specifically, the compensation-signal generating unit 221a includes a model-position calculating unit 241. The model-position calculating unit 241 receives the motion target value $p_{ref}$ from the outside and receives the anti-resonant frequency $\omega_z$ equivalent to the damping parameter signal θ from the generating unit 222a of the damping-parameter determining unit 222. The model-position calculating unit 241 removes a component corresponding to the anti-resonant frequency $\omega_z$ from the motion target value $p_{ref}$ according to Formula (8) and outputs a signal, from which the component is removed, to the feedback control unit 112 and the change-amount calculating unit 221b as the model position $p_a$.

The change-amount calculating unit 221b calculates, as a parameter (a second parameter) corresponding to a temporal change amount of the damping parameter signal θ, a value obtained by temporally subjecting the motion compensation signal (the model position $p_a$) generated by the compensation-signal generating unit 221a to first-order and second-order differential.

Specifically, the change-amount calculating unit 221b includes a model position differentiator 245 and a model speed differentiator 246. The model position differentiator 245 receives the motion compensation signal (the model position $p_a$) from the model-position calculating unit 241 and calculates the first-order differential value $p^{(1)}_a$ of the motion compensation signal (the model position $p_a$). At this point, as indicated by Formulas (7) to (10), the model position differentiator 245 calculates, by temporally subjecting the motion compensation signal (the model position $p_a$) generated by the compensation-signal generating unit 221a to first-order differential, the model speed $v_a$ such that the control target 1 does not excite vibration. The model position differentiator 245 outputs a result of the calculation to the feedback control unit 112 and the model speed differentiator 246 as the model speed $v_a$.

The model speed differentiator 246 receives the model speed $v_a$ from the model position differentiator 245 and calculates a first-order differential value $v^{(1)}_a$ of the model speed $v_a$. The model speed differentiator 246 outputs a result of the calculation to the torque calculating unit 221c as a value obtained by temporally subjecting the motion compensation signal (the model position $p_a$) to second-order differential.

The torque calculating unit 221c calculates, according to the motion target value $p_{ref}$, the damping parameter signal (the first parameter) θ, and the second-order differential value (the second parameter) $v^{(1)}_a$ of the motion compensation signal, the model torque $\tau_a$ such that the control target 1 does not excite vibration.

Specifically, the torque calculating unit 221c includes an inertia-moment multiplying unit 244. The inertia-moment multiplying unit 244 receives the second-order differential value of the motion compensation signal (the first-order differential value $v^{(1)}_a$ of the model speed) from the model speed differentiator 246. The second-order differential value of the motion compensation signal includes the motion target value $p_{ref}$ and the damping parameter signal θ (the anti-resonant frequency $\omega_z$) as indicated by Formula (15) below. That is, the inertia-moment multiplying-unit 244 calculates the model torque $\tau_a$ by applying a relation that the resonant frequency $\omega_p$ and the anti-resonant frequency $\omega_z$ are the same ($\omega_a = \omega_z$) to the second-order differential value $v^{(1)}_a$ of the motion compensation signal including the motion target value $p_{ref}$ and the damping parameter signal (the first parameter) θ and further multiplying the second-order differential value $v^{(1)}_a$. The inertia-moment multiplying unit 244 outputs the calculated model torque $\tau_a$ to the torque adder 113.

A specific operation of the damping filter 221 is explained with reference to FIG. 7.

The model-position calculating unit 241 calculates, based on the motion target value $p_{ref}$ input from the outside and the anti-resonant frequency $\omega_z$ input from the damping-parameter determining unit 122, according to Formula (8), the model position $p_a$ obtained by removing a component corresponding to the anti-resonant frequency $\omega_z$ from the motion target value $p_{ref}$. The model-position calculating unit 241 outputs the calculated model position $p_a$ to the model position differentiator 245 and the feedback control unit 112.

The model position differentiator 245 receives the model position $p_a$, calculates a first-order differential value of the model position $p_a$, and outputs a result of the calculation to the model speed differentiator 246 and the feedback control unit 112 as the model speed $v_a$. That is, the model position differentiator 245 directly calculates the first-order differential of the model position $p_a$ to calculate a signal equivalent to the model speed $v_a$ represented by Formula (10) and outputs the signal to the model speed differentiator 246 and the feedback control unit 112.

The model speed differentiator 246 receives the model speed $v_a$ from the model position differentiator 245, calculates the first-order differential value $v(1)a$ of the model speed, and outputs a result of the calculation to the inertia-moment multiplying unit 244. That is, the model speed differentiator 246 directly calculates the first-order differential of the model speed $v_a$ to calculate a signal equivalent to Formula (15) below and outputs the signal to the inertia-moment multiplying unit 244.

$$v^{(1)}_a = 1/\omega_z^2 \times p^{(4)}_{ref} - 4 \times \omega_z^{(1)}/\omega_z^3 \times p^{(3)}_{ref} + (-2 \times \omega^{(2)}_z/\omega_z^3 + 6 \times (\omega^{(1)}_z)^2/\omega_z^4) \times p^{(2)}_{ref} + p^{(2)}_{ref} \quad (15)$$

The inertia-moment multiplying unit 244 multiplies the output $v^{(1)}_a$ of the model speed differentiator 246 with the moment of inertia $(J_M+J_L)$ and outputs a product of the output $v^{(1)}_a$ and the moment of inertia $(J_M+J_L)$ to the torque adder 113 as the model torque $\tau_a$.

That is, when the resonant frequency $\omega_p$ and the anti-resonant frequency $\omega_z$ are substantially equal ($\omega_p \equiv \omega_z$), the model torque $\tau_a$ calculated using Formula (12) in the first embodiment coincides with the model torque $\tau_a$ calculated when the resonant frequency $\omega_p$ and the anti-resonant frequency $\omega_z$ are equal ($\omega_p = \omega_z$). In this way, when the resonant frequency $\omega_p$ and the anti-resonant frequency $\omega_z$ are substantially equal ($\omega_p \equiv \omega_z$), as values, the model position $p_a$, the model speed $v_a$, and the model torque $\tau_a$ output by the damping filter 121 in the first embodiment and the model position $p_a$, the model speed $v_a$, and the model torque $\tau_a$ output by the damping filter 221 in this embodiment are the same, although only methods of calculating the model position $p_a$, the model speed $v_a$, and the model torque $\tau_a$ are different. Therefore, concerning a control target, the resonant frequency $\omega_p$ and the anti-resonant frequency $\omega_z$ of which are close ($\omega_p \equiv \omega_z$), such as the Cartesian biaxial robot shown in FIG. 3, the damping filter 221 can obtain effects equivalent to the effects in the first embodiment with a simple calculation.

The damping filter 221 can obtain the effects equivalent to the effects in the first embodiment without using the first-order differential $\omega^{(1)}_z$ and the second order differential $\omega^{(2)}_z$ of the anti-resonant frequency $\omega_z$ because of a configuration (calculation order) for differentiating, using the anti-resonant frequency $\omega_z$, the model position $p_a$, which is a signal after removing a component corresponding to the anti-resonant frequency $\omega_z$ from the motion target value $p_{ref}$. The model position differentiator 245 calculates the first-order differential value $\omega^{(1)}_z$ of the anti-resonant frequency equivalent to the damping parameter variation signal $\theta'$ in the first embodiment by subjecting the model position $p_a$, which is the signal obtained by removing the component corresponding to the anti-resonant frequency $\omega_z$ from the motion target value $p_{ref}$, to first-order differential and compensates for the first-order differential value $\omega^{(1)}_z$. Similarly, the model position differentiator 245 calculates the second-order differential value $\omega^{(2)}_z$ of the anti-resonant frequency equivalent to the damping parameter variation signal $\theta'$ in the first embodiment by subjecting the model speed $v_a$ to first-order differential and calculating a second-order differential value of the model position $p_a$ and compensates for the second-order differential value $\omega^{(2)}_z$. In this way, the damping filter 221 is configured to calculate the differential $\omega^{(1)}_z$ and the second-order differential $\omega^{(2)}_z$ of the anti-resonant frequency equivalent to the damping parameter variation signal $\theta'$ on the inside of the damping filter 121. Therefore, the damping filter 221 can obtain effects equivalent to the effects of the damping filter 121 in the first embodiment without using the damping parameter variation signal $\theta'$ itself.

As explained above, according to the second embodiment, when resonant frequency $\omega_p$ and the anti-resonant frequency $\omega_z$ are substantially equal ($\omega_p \equiv \omega_z$), it is possible to calculate the model speed $v_a$ and the model torque $\tau_a$ equivalent to those in the first embodiment using (generating) parameters (a first-order differential value and a second-order differential value of a motion compensation signal) equivalent to the damping parameter variation signal $\theta'$ without using (generating) the damping parameter variation signal $\theta'$ itself.

Third Embodiment

A motor control device 300 according to a third embodiment is explained. In the following explanation, differences from the first embodiment are mainly explained.

A difference between the motor control device 300 according to this embodiment and the motor control device 100 according to the first embodiment resides in a processing content (a method of calculating a model position, model speed, and model torque) in a damping filter. That is, even when the resonant frequency $\omega_p$ and the anti-resonant frequency $\omega_z$ of the control target 1 are different, the motor control device 300 generates motion compensation signals (the model position $p_a$ and a resonant frequency compensation signal $p_{cp}$) obtained by removing a frequency component corresponding to the damping parameter signal $\theta$ from the motion target value $p_{ref}$ and performs first-order differential of the generated motion compensation signal (the model position $p_a$) to calculate the model speed $v_a$ and performs second-order differential of the motion compensation signal (the resonant frequency compensation signal $p_{cp}$) to calculate the model torque $\tau_a$.

Figure 8:
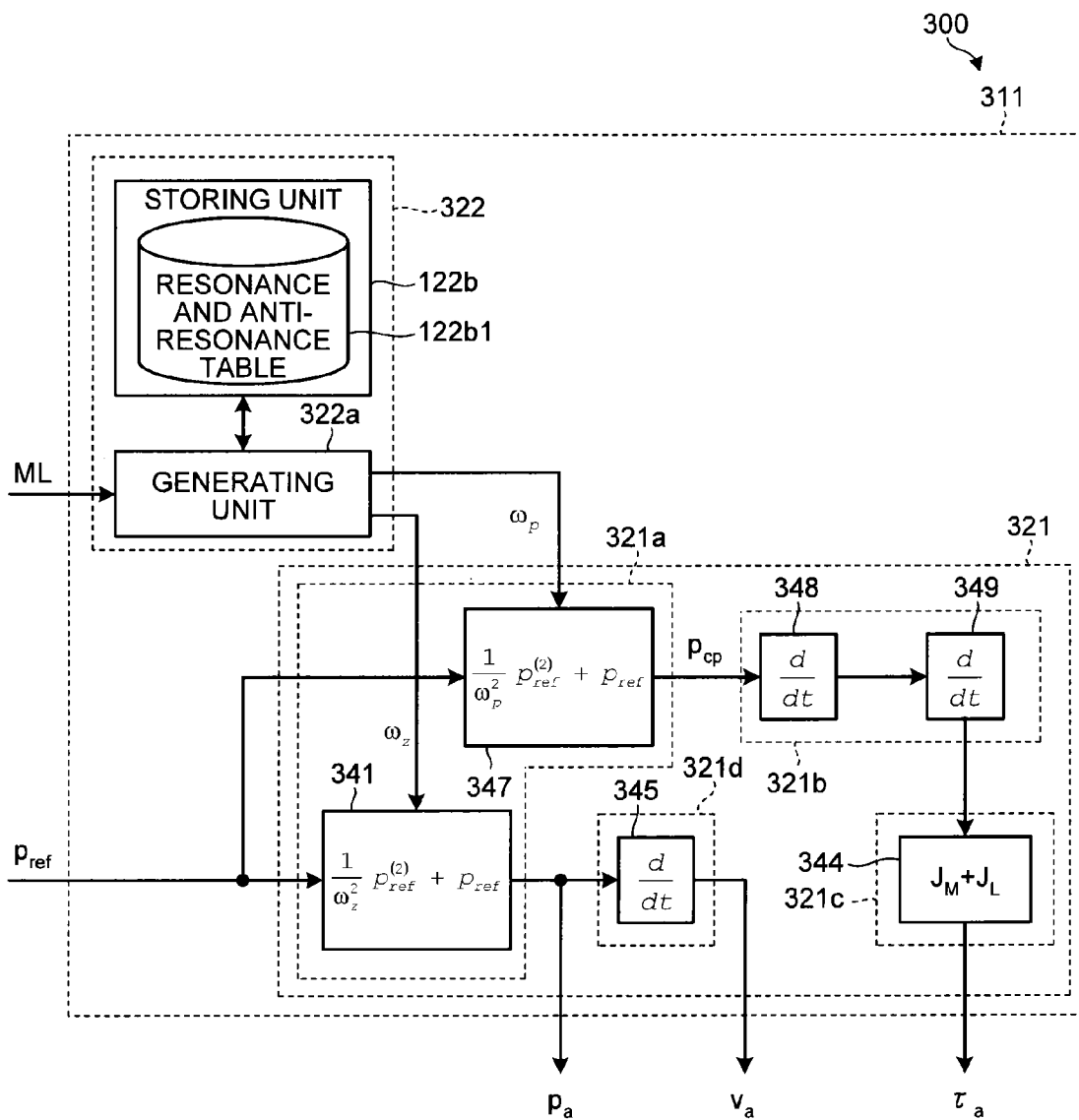
FIG. 8 is a diagram of the configuration of a feed-forward control unit in a third embodiment.

Specifically, the motor control device 300 includes a feed-forward control unit 311 shown in FIG. 8. FIG. 8 is a block diagram of an internal configuration of the feed-forward control unit 311 in the third embodiment.

The feed-forward control unit 311 does not include the damping parameter filter 123 and includes a damping-parameter determining unit 322 and a damping filter 321.

The damping-parameter determining unit 322 includes a generating unit 322a. The generating unit 322a outputs the resonant frequency $\omega_p$ and the anti-resonant frequency $\omega_z$ to the damping filter 321 as the damping parameter variation signal $\theta$ according to the parameter change signal ML.

The damping filter 321 includes a compensation-signal generating unit (a second generating unit) 321a, a speed calculating unit 321d, a change-amount calculating unit (a first calculating unit) 321b, and a torque calculating unit (a second calculating unit) 321c.

The compensation-signal generating unit 321a generates a motion compensation signal (the resonant frequency compensation signal $p_{cp}$) obtained by removing a frequency component corresponding to the damping parameter variation signal $\theta$ (the resonant frequency $\omega_p$) from the motion target value $p_{ref}$.

Specifically, the compensation-signal generating unit 321a includes a model-position calculating unit 341 and a resonance-compensation-signal calculating unit 347. The model-position calculating unit 341 receives the motion target value $p_{ref}$ from the outside and receives the anti-resonant frequency $\omega_z$ equivalent to the damping parameter signal θ from the generating unit 322a of the damping-parameter determining unit 322. The model-position calculating unit 341 removes a component corresponding to the anti-resonant frequency $\omega_z$ from the motion target value $p_{ref}$ according to Formula (8) and outputs a signal, from which the component is removed, to the feedback control unit 112 and the speed calculating unit 321d as the model position $p_a$.

The resonance-compensation-signal calculating unit 347 receives the motion target value $p_{ref}$ from the outside and receives the resonant frequency $\omega_p$ equivalent to the damping parameter signal θ from the generating unit 322a of the damping-parameter determining unit 322. The resonance-compensation-signal calculating unit 347 removes a component corresponding to the resonant frequency $\omega_p$ from the motion target value $p_{ref}$ according to Formula (16) below and outputs a signal, from which the component is removed, to the change-amount calculating unit 321b as a resonance compensation signal $p_{cp}$.

The speed calculating unit 321d includes a model position differentiator 345. The model position differentiator 345 receives the model position $p_a$, which is a signal obtained by anti-resonant frequency component from the motion target value $p_{ref}$, from the model-position calculating unit 341. The model position differentiator 345 calculates the first-order differential value $p^{(1)}_a$ of the model position and outputs a result of the calculation to the feedback control unit 112 as the model speed $v_a$.

The change-amount calculating unit 321b calculates, as a parameter (a second parameter) corresponding to a temporal change amount of the damping parameter signal θ, a value obtained by temporally subjecting the motion compensation signal (the resonant frequency compensation position $p_{cp}$) generated by the compensation-signal generating unit 221a to second-order differential.

Specifically, the change-amount calculating unit 321b includes a resonance-compensation-signal differentiator 348 and a resonance-compensation-signal second-order differentiator 349. The resonance-compensation-signal differentiator 348 receives the resonance compensation signal $p_{cp}$, calculates a first-order differential value $p^{(1)}_{cp}$ of the resonance compensation signal $p_{cp}$, and outputs a result of the calculation to the resonance-compensation-signal second-order differentiator 349.

The resonance-compensation-signal second-order differentiator 349 receives the first-order differential value $p^{(1)}_{cp}$ of the resonance compensation signal from the resonance-compensation-signal differentiator 348 and calculates a first-order differential value $p^{(2)}_{cp}$ of the first-order differential value $p^{(1)}_{cp}$. The resonance-compensation-signal second-order differentiator 349 outputs a result of the calculation to the torque calculating unit 321c as a value obtained by temporally subjecting the motion compensation signal (the resonance compensation signal $p_{cp}$) to second-order differential.

The torque calculating unit 321c calculates, according to the motion target value $p_{ref}$, the damping parameter signal (the first parameter) θ, and the second-order differential value (the second parameter) $p^{(2)}_{cp}$ of the motion compensation signal, the model torque $\tau_a$ such that the control target 1 does not excite vibration.

Specifically, the torque calculating unit 321c includes an inertia-moment multiplying unit 344. The inertia-moment multiplying unit 344 receives the second-order differential value of the motion compensation signal (the second-order differential value $c^{(2)}_{cp}$) from the resonance-compensation-signal second-order differentiator 349. The second-order differential value of the motion compensation signal includes the motion target value $p_{ref}$ and the damping parameter signal θ (the resonant frequency $\omega_p$) as indicated by Formula (18) below. That is, the inertia-moment multiplying unit 344 calculates the model torque $\tau_a$ by multiplying the second-order differential value $p^{(2)}_{cp}$ of the motion compensation signal including the motion target value $p_{ref}$ and the damping parameter signal (the first parameter) θ with the moment of inertia $(J_M+J_L)$. The inertia-moment multiplying unit 344 outputs the calculated model torque $\tau_a$ to the torque adder 113.

A specific operation of the damping filter 321 is explained with reference to FIG. 8.

The model-position calculating unit 341 calculates, based on the motion target value $p_{ref}$ input from the outside and the anti-resonant frequency $\omega_z$ input from the damping-parameter determining unit 322, according to Formula (8), the model position $p_a$ obtained by removing a component corresponding to the anti-resonant frequency $\omega_z$ from the motion target value $p_{ref}$. The model-position calculating unit 341 outputs the calculated model position $p_a$ to the model position differentiator 345 and the feedback control unit 112.

The model position differentiator 345 receives the model position $p_a$, calculates the first-order differential value $p^{(1)}_a$ of the model position $p_a$, and outputs a result of the calculation to the feedback control unit 112 as the model speed $v_a$. Therefore, the model position $p_a$ and the model speed $v_a$ calculated by the damping filter 321 are respectively represented by Formula (8) and Formula (10).

On the other hand, the resonance-compensation-signal calculating unit 347 receives the motion target value $p_{ref}$ from the outside, receives the resonant frequency $\omega_p$ equivalent to the damping parameter signal θ from the damping-parameter determining unit 322, removes a resonant frequency component from the motion target value $p_{ref}$ according to the calculation of Formula (16) below, and outputs a result of the calculation to the resonance-compensation-signal differentiator 348 as the resonance compensation signal $p_{cp}$.

$$p_{cp}=1/\omega_p^2 \times p^{(2)}_{ref}+p_{ref} \qquad (16)$$

The resonance-compensation-signal differentiator 348 receives the resonance compensation signal $p_{cp}$ from the resonance-compensation-signal calculating unit 347, calculates the first-order differential value $p^{(1)}_{cp}$ of the resonance compensation signal $p_{cp}$, and outputs a result of the calculation to the resonance-compensation-signal second-order differentiator 349. That is, the output of the resonance-compensation-signal differentiator 348 is equivalent to a signal represented by Formula (17).

$$p^{(1)}_{cp}=1/\omega_p^2 \times p^{(3)}_{ref}-2\times\omega^{(1)}_p/\omega_p^3 \times p^{(2)}_{ref}+p^{(1)}_{ref} \qquad (17)$$

The resonance-compensation-signal second-order differentiator 349 receives the first-order differential value $p^{(1)}_{cp}$ of the resonance compensation signal from the resonance-compensation-signal differentiator 348, differentiates the differential of the resonance compensation signal to calculate the second-order differential $p^{(2)}_{cp}$ of the resonance compensation signal, and outputs a result of the calculation to the inertia-moment multiplying unit 344. That is, the output of the resonance-compensation-signal second-order differentiator 349 is equivalent to a signal represented by Formula (18).

$$p^{(2)}_{cp}=1/\omega_p^2 \times p^{(4)}_{ref}-4\times\omega^{(1)}_p/\omega_p^3 \times p^{(3)}_{ref}+(-2\times\omega^{(2)}_p/\omega_p^3+6\times(\omega^{(1)}_p)^2/\omega_p^4)\times p^{(2)}_{ref}+p^{(2)}_{ref} \qquad (18)$$

The inertia moment multiplying unit 344 multiplies the second-order differential value $p^{(2)}{}_{cp}$ of the resonance compensation signal, which is the output of the resonance-compensation-signal second-order differentiator 349, with the moment of inertia $(J_M + J_L)$ and outputs a product of the second-order differential value $p^{(2)}{}_{cp}$ and the moment of inertia $(J_M + J_L)$ to the torque adder 113 as the model torque $\tau_a$. That is, the inertia moment multiplying unit 344 outputs a signal equivalent to Formula (12) to the torque adder 113. In this way, as values, the model position $p_a$, the model speed $v_a$, and the model torque $\tau_a$ output by the damping filter 321 in the first embodiment and the model position $p_a$, the model speed $v_a$, and the model torque $\tau_a$ output by the damping filter 121 in this embodiment are the same, although only methods of calculating the model position $p_a$, the model speed $v_a$, and the model torque $\tau_a$ are different. Therefore, concerning a control target, the resonant frequency $\omega_p$ and the anti-resonant frequency $\omega_z$ of which are close ($\omega_p \equiv \omega_z$), and a control target, the resonant frequency $\omega_p$ and the anti-resonant frequency $\omega_z$ of which are different ($\omega_p \neq \omega_z$), the damping filter 321 can obtain effects equivalent to the effects in the first embodiment with a simple calculation.

The damping filter 321 can obtain the effects equivalent to the effects in the first embodiment without using the first-order differential $\omega^{(1)}{}_z$ and the second order differential $\omega^{(2)}{}_z$ of the resonant frequency $\omega_p$ because of a configuration (calculation order) in which the damping filter 321 itself calculates the first-order differential $\omega^{(1)}{}_z$ and the second order differential $\omega^{(2)}{}_z$ of resonant frequency equivalent to the damping parameter variation signal $\theta'$ in the first embodiment by differentiating the resonance compensation signal $\omega^{(1)}{}_p$, which is a signal from which a component corresponding to the resonant frequency $\omega_p$ is removed.

As explained above, according to the third embodiment, irrespective of whether resonant frequency $\omega_p$ and the anti-resonant frequency $\omega_z$ are substantially equal ($\omega_p \equiv \omega_z$) or the resonant frequency $\omega_p$ and the anti-resonant frequency $\omega_z$ of which are different ($\omega_p \neq \omega_z$), it is possible to calculate the model speed $v_a$ and the model torque $\tau_a$ equivalent to those in the first embodiment using (generating) parameters (a first-order differential value and a second-order differential value of a motion compensation signal) equivalent to the damping parameter variation signal $\theta'$ without using (generating) the damping parameter variation signal $\theta'$ itself.

Fourth Embodiment

A motor control device 400 according to a fourth embodiment is explained. In the following explanation, differences from the first embodiment are mainly explained.

A difference between the motor control device 400 according to this embodiment and the motor control device 100 according to the first embodiment resides in a processing content (a method of calculating a model position, model speed, and model torque) in a damping filter. That is, even when the resonant frequency $\omega_p$ and the anti-resonant frequency $\omega_z$ of the control target 1 are different, the motor control device 400 generates motion compensation signal (the model position $p_a$ obtained by removing a frequency component corresponding to the damping parameter signal $\theta$ from the motion target value $p_{ref}$ and performs first-order differential and second-order differential of the generated motion compensation signal (the model position $p_a$) to respectively calculate the model speed $v_a$ and the model torque $\tau_a$.

Figure 9:
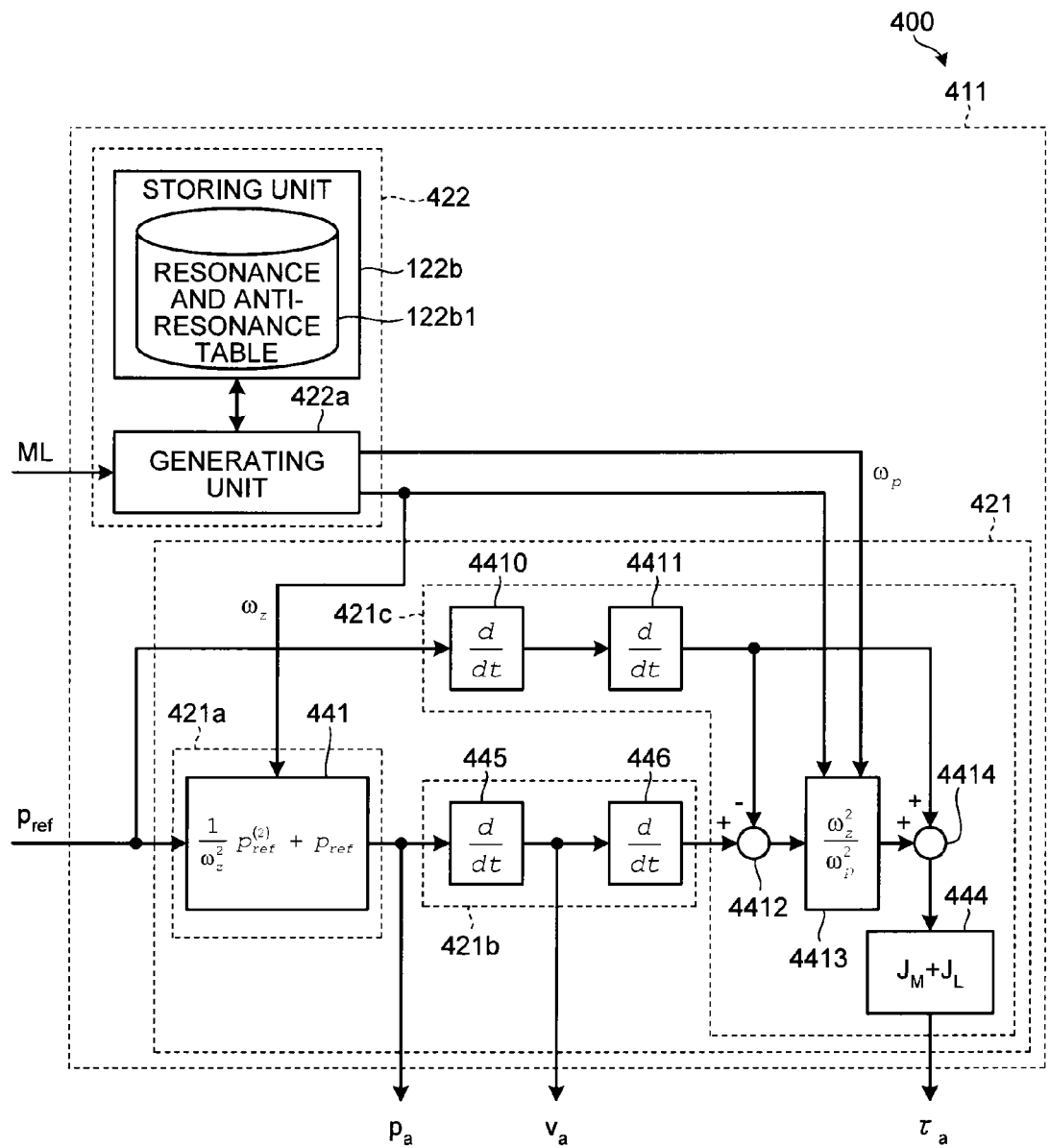
FIG. 9 is a diagram of the configuration of a feed-forward control unit in a fourth embodiment.

Specifically, the motor control device 400 includes a feed-forward control unit 411 shown in FIG. 9. FIG. 9 is a block diagram of an internal configuration of the feed-forward control unit 411 in the fourth embodiment.

The feed-forward control unit 411 does not include the damping parameter filter 123 and includes a damping-parameter determining unit 422 and a damping filter 421.

The damping-parameter determining unit 422 includes a generating unit 422a. The generating unit 422a outputs the resonant frequency $\omega_p$ and the anti-resonant frequency $\omega_z$ to the damping filter 421 as the damping parameter variation signal $\theta$ according to the parameter change signal ML.

The damping filter 421 includes a compensation-signal generating unit (a second generating unit) 421a, a change-amount calculating unit (a first calculating unit) 421b, and a torque calculating unit (a second calculating unit) 421c.

The compensation-signal generating unit 421a generates a motion compensation signal (the model position $p_a$) obtained by removing a frequency component corresponding to the damping parameter variation signal $\theta$ (the anti-resonant frequency $\omega_z$) from the motion target value $p_{ref}$.

Specifically, the compensation-signal generating unit 421a includes a model-position calculating unit 441. The model-position calculating unit 441 receives the motion target value $p_{ref}$ from the outside and receives the anti-resonant frequency $\omega_z$ equivalent to the damping parameter signal $\theta$ from the generating unit 422a of the damping-parameter determining unit 422. The model-position calculating unit 441 removes a component corresponding to the anti-resonant frequency $\omega_z$ from the motion target value $p_{ref}$ according to Formula (8) and outputs a signal, from which the component is removed, to the feedback control unit 112 and the change-amount calculating unit 421b as the model position $p_a$.

The change-amount calculating unit 421b calculates, as a parameter (a second parameter) corresponding to a temporal change amount of the damping parameter signal $\theta$, a value obtained by temporally subjecting the motion compensation signal (the model position $p_a$) generated by the compensation-signal generating unit 421a to second-order differential.

Specifically, the change-amount calculating unit 421b includes a model position differentiator 445 and a model speed differentiator 446. The model position differentiator 445 receives the motion compensation signal (the model position $p_a$) from the model-position calculating unit 441 and calculates the first-order differential value $p^{(1)}{}_a$ of the motion compensation signal (the model position $p_a$). At this point, as indicated by Formulas (7) to (10), the model position differentiator 445 calculates, by temporally subjecting the motion compensation signal (the model position $p_a$) generated by the compensation-signal generating unit 421a to first-order differential, the model speed $v_a$ such that the control target 1 does not excite vibration. The model position differentiator 445 outputs a result of the calculation to the feedback control unit 112 and the model speed differentiator 446 as the model speed $v_a$.

The model speed differentiator 446 receives the model speed $v_a$ from the model position differentiator 445 and calculates the first-order differential value $v^{(1)}{}_a$ of the model speed $v_a$. The model speed differentiator 246 outputs a result of the calculation to the torque calculating unit 421c as a value obtained by temporally subjecting the motion compensation signal (the model position $p_a$) to second-order differential.

The torque calculating unit 421c calculates, according to the motion target value $p_{ref}$, the damping parameter signal (the first parameter) $\theta$, and the second-order differential value (the second parameter) $v^{(1)}{}_a$ of the motion compensation signal, the model torque $\tau_a$ such that the control target 1 does not excite vibration.

Specifically, the torque calculating unit 421c includes a target value differentiator 4410, a target value second-order differentiator 4411, a model-torque subtractor 4412, a model-torque compensating unit 4413, model torque adder 4414, and an inertia-moment multiplying unit 444. The target value differentiator 4410 receives the motion target value $p_{ref}$ from the outside, calculates the first-order differential value $p^{(1)}_{ref}$ of the motion target value, and outputs a result of the calculation to the target value second-order differentiator 4411.

The target value second-order differentiator 4411 receives the first-order differential value $p^{(1)}_{ref}$ of the motion target value from the target value differentiator 4410, calculates a first-order differential value of the first-order differential value $p^{(1)}_{ref}$, and outputs a result of the calculation to the model torque subtractor 4412 and the model torque adder 4414 as the second-order differential value $p^{(2)}_{ref}$ of the motion target value.

The model torque subtractor 4412 receives the second-order differential value $p^{(2)}_{ref}$ of the motion target value from the target value second-order differentiator 4411 and receives the first-order differential value $p^{(1)}_a$ of the model speed $v_a$ from the model speed differentiator 446. The model torque subtractor 4412 subtracts the second-order differential value $p^{(2)}_{ref}$ of the motion target value from the first-order differential value $p^{(1)}_a$ of the model speed $v_a$ and outputs a result of the calculation to the model-torque compensating unit 4413.

The model-torque compensating unit 4413 receives the subtraction result from the model torque subtractor 4412 and receives the (present) resonant frequency $\omega_p$ and the (present) anti-resonant frequency $\omega_z$ (of the control target 1) from the damping-parameter determining unit 422. The model-torque compensating unit 4413 calculates a value obtained by multiplying the subtraction result by the model torque subtractor 4412 with the square of the anti-resonant frequency $\omega_z$ and dividing the multiplied subtraction result by the square of the resonant frequency $\omega_p$ and outputs a result of the calculation to the model torque adder 4414.

The model torque adder 4414 receives the calculation result from the model-torque compensating unit 4413, receives the second-order differential value $p^{(2)}_{ref}$ of the motion target value from the target value second-order differentiator 4411, adds up the calculation result and the second-order differential value $p^{(2)}_{ref}$, and outputs a result of the addition to the inertia-moment multiplying unit 444.

The inertia-moment multiplying unit 444 multiplies the addition result by the model torque adder 4414 with the moment of inertia and outputs a product of the addition result and the moment of inertia to the torque adder 113 as the model torque τa.

A specific operation of the damping filter 421 is explained in detail with reference to FIG. 9.

The model speed differentiator 446 receives the model speed $v_a$ from the model position differentiator 445 and calculates the first-order differential value $v^{(1)}_a$ of the model speed and outputs a result of the calculation to the model torque subtractor 4412. That is, the model speed differentiator 446 directly calculates first-order differential of the model speed $v_a$ to calculate a signal equivalent to Formula (19) below and outputs the signal to the model torque subtractor 4412.

$$v^{(1)}_a = 1/\omega_z^2 \times \{p^{(4)}_{ref} - 4\times\omega_p^{(1)}/\omega_p \times p^{(3)}_{ref} + (-2\times\omega^{(2)}_p/\omega_p + 6\times(\omega^{(1)}_p)^2/\omega_p^2)\times p^{(2)}_{ref}\} + p^{(2)}_{ref} \quad (19)$$

In Formula (19), the following assumption is used:

$$\omega^{(1)}_p/\omega_p = \omega^{(1)}_z/\omega_z, \omega^{(2)}_p/\omega_p = \omega^{(2)}_z/\omega_z \quad (20)$$

If the control target 1 can be represented by a two-inertia system model, the spring constant $k_m$ of which changes during motion, the assumption of Formula (20) strictly holds from $\omega_p = \sqrt{(k_m/(J_L+J_M))}$, $\omega_z = \sqrt{(k_m/J_L)}$.

The model torque subtractor 4412 receives the first-order differential value $v^{(1)}_a$ of the model speed from the model speed differentiator 446 and receives the second-order differential value $p^{(2)}_{ref}$ of the motion target value from the target value second-order differentiator 4411. The model torque subtractor 4412 subtracts second-order differential value $p^{(2)}_{ref}$ of the motion target value from the first-order differential value $v^{(1)}_a$ of the model speed and outputs a result of the subtraction to the model-torque compensating unit 4413. That is, the model torque subtractor 4412 outputs a value of Formula (21) below to the model-torque compensating unit 4413.

$$p^{(4)}_{ref} - 4\times\omega_p^{(1)}/\omega_p \times p^{(3)}_{ref} + (-2\times\omega^{(2)}_p/\omega_p + 6\times(\omega^{(1)}_p)^2/\omega_p^2)\times p^{(2)}_{ref} \quad (21)$$

The model-torque compensating unit 4413 calculates a value obtained by multiplying the subtraction result by the model torque subtractor 4412 with the square of the anti-resonant frequency $\omega_z$ and dividing the multiplied subtraction result by the square of the resonant frequency $\omega_p$ and outputs a result of the calculation to the model torque adder 4414. Therefore, a value calculated by Formula (22) is output to the model torque adder 4414.

$$1/\omega_p^2 \times p^{(4)}_{ref} - 4\times\omega^{(1)}_p/\omega_p^3 \times p^{(3)}_{ref} + (-2\times\omega^{(2)}_p/\omega_p^2 + 6\times(\omega^{(1)}_p)^2/\omega_p^4)\times p^{(2)}_{ref} \quad (22)$$

The model torque adder 4414 adds the second-order differential value $p^{(2)}_{ref}$ of the motion target value to the calculation result by the model torque compensator 4413. The model torque adder 4414 outputs a sum of the calculation result and the second-order differential value $p^{(2)}_{ref}$ to the inertia-moment multiplying unit 444. Therefore, a signal having a value equivalent to a value calculated by Formula (23) is output to the inertia-moment multiplying unit 444.

$$1/\omega_p^2 \times p^{(4)}_{ref} - 4\times\omega^{(1)}_p/\omega_p^3 \times p^{(3)}_{ref} + (-2\times\omega^{(2)}_p/\omega_p^2 + 6\times(\omega^{(1)}_p)^2/\omega_p^4)\times p^{(2)}_{ref} + p^{(2)}_{ref} \quad (23)$$

The inertia-moment multiplying unit 444 multiplies the addition result by the model torque adder 4414 with the moment of inertia $(J_M+J_L)$ and outputs a product of the addition result and the moment of inertia $(J_M+J_L)$ to the torque adder 113 as the model torque $\tau_a$.

that is, the output of the inertia-moment multiplying unit 444 is the value calculated by Formula (12) as in the inertia-moment multiplying unit 144 in the first embodiment. Therefore, values of the model position $p_a$, the model speed $v_a$, and the model torque $\tau_a$ output from the damping filter 421 are respectively Formulas (8), (10), and (12). Therefore, as values, the model position $p_a$, the model speed $v_a$, and the model torque $\tau_a$ output by the feed-forward control unit 111 in the first embodiment and the model position $p_a$, the model speed $v_a$, and the model torque $\tau_a$ output by the feed-forward control unit 411 in this embodiment are the same, although only methods of calculating the model position $p_a$, the model speed $v_a$, and the model torque $\tau_a$ are different. Therefore, in the system in the fourth embodiment, it is possible to obtain effects same as the effects in the first embodiment.

As explained above, according to the fourth embodiment, irrespective of whether resonant frequency $\omega_p$ and the anti-resonant frequency $\omega_z$ are substantially equal ($\omega_p \equiv \omega_z$) or the resonant frequency $\omega_p$ and the anti-resonant frequency $\omega_z$ of which are different ($\omega_p \neq \omega_z$), it is possible to calculate the model speed $v_a$ and the model torque $\tau_a$ equivalent to those in the first embodiment using (generating) parameters (a first-order differential value and a second-order differential value of a motion compensation signal) equivalent to the damping parameter variation signal θ without using (generating) the damping parameter variation signal θ itself.

Fifth Embodiment

Figure 10:
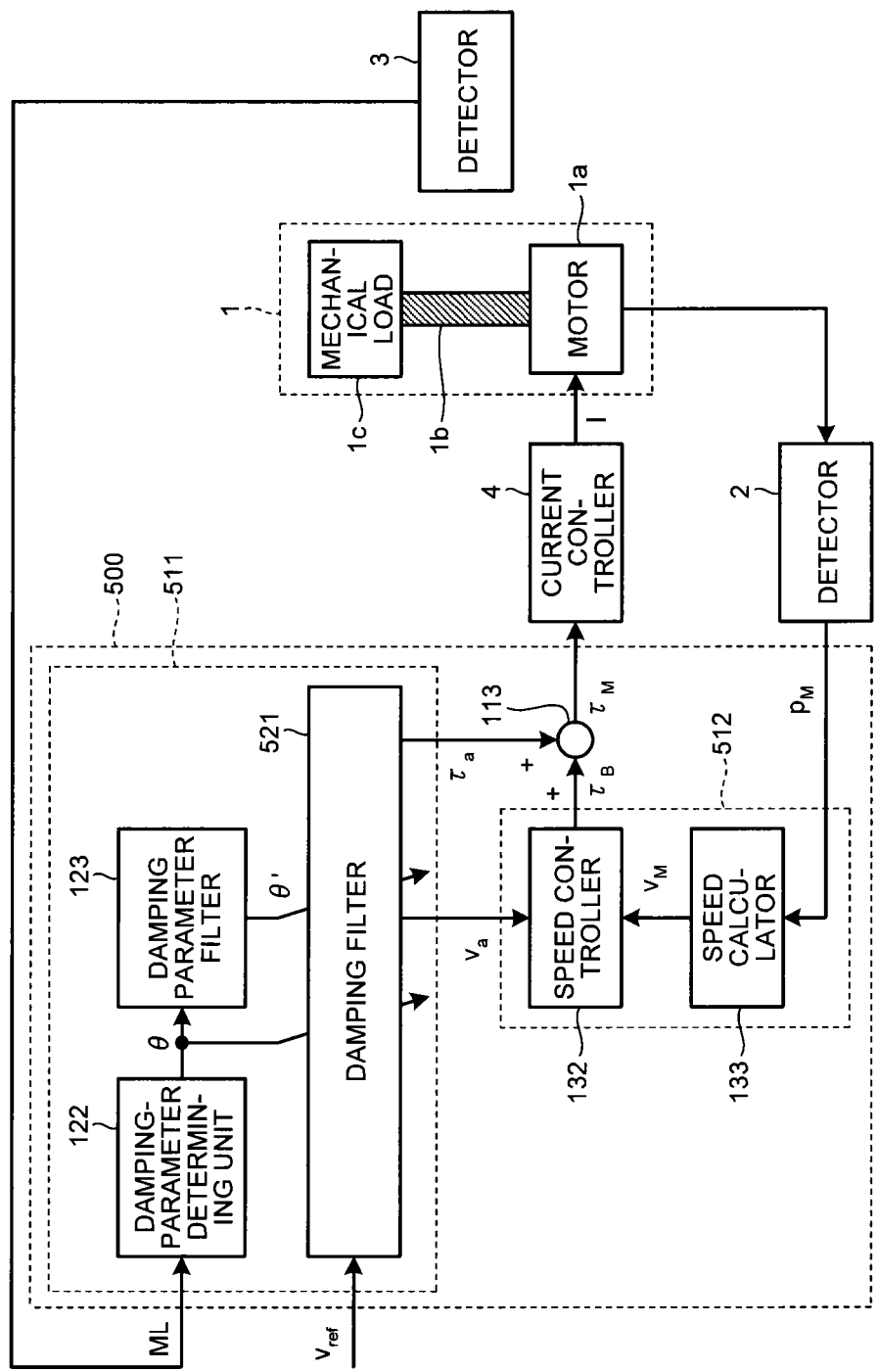
FIG. 10 is a diagram of the configuration of a motor control device according to a fifth embodiment.

A motor control device 500 according to a fifth embodiment is explained. FIG. 10 is a block diagram of the configuration of the motor control device 500 according to the fifth embodiment. In the following explanation, differences from the first embodiment are mainly explained.

A difference between this embodiment and the first embodiment is that, while the first embodiment is the position control for causing the motor motion detection value $p_M$ to follow the desired motion target value (the position command) $p_{ref}$, this embodiment is speed control for causing the motor speed calculation value $v_M$ to follow a motion target value (a speed command) $v_{ref}$. That is, the motor control device 500 receives the motion target value (the speed command) $v_{ref}$ representing a speed target value of the control target 1 to be driven from the outside (e.g., a not-shown host controller) and develops the torque command $\tau_M$ such that the motor speed calculation value $v_M$ corresponding to the motor motion detection value $p_M$ follows a motion target value $v_{ref}$. The motor control device 500 outputs the torque command $\tau_M$ to the current controller 4.

Specifically, the motor control device 500 includes a feed-forward control unit 511 and a feedback control unit 512. The feedback control unit 512 does not include the position controller 131 (see FIG. 1) and includes the speed calculator 133 and the speed controller 132.

Figure 11:
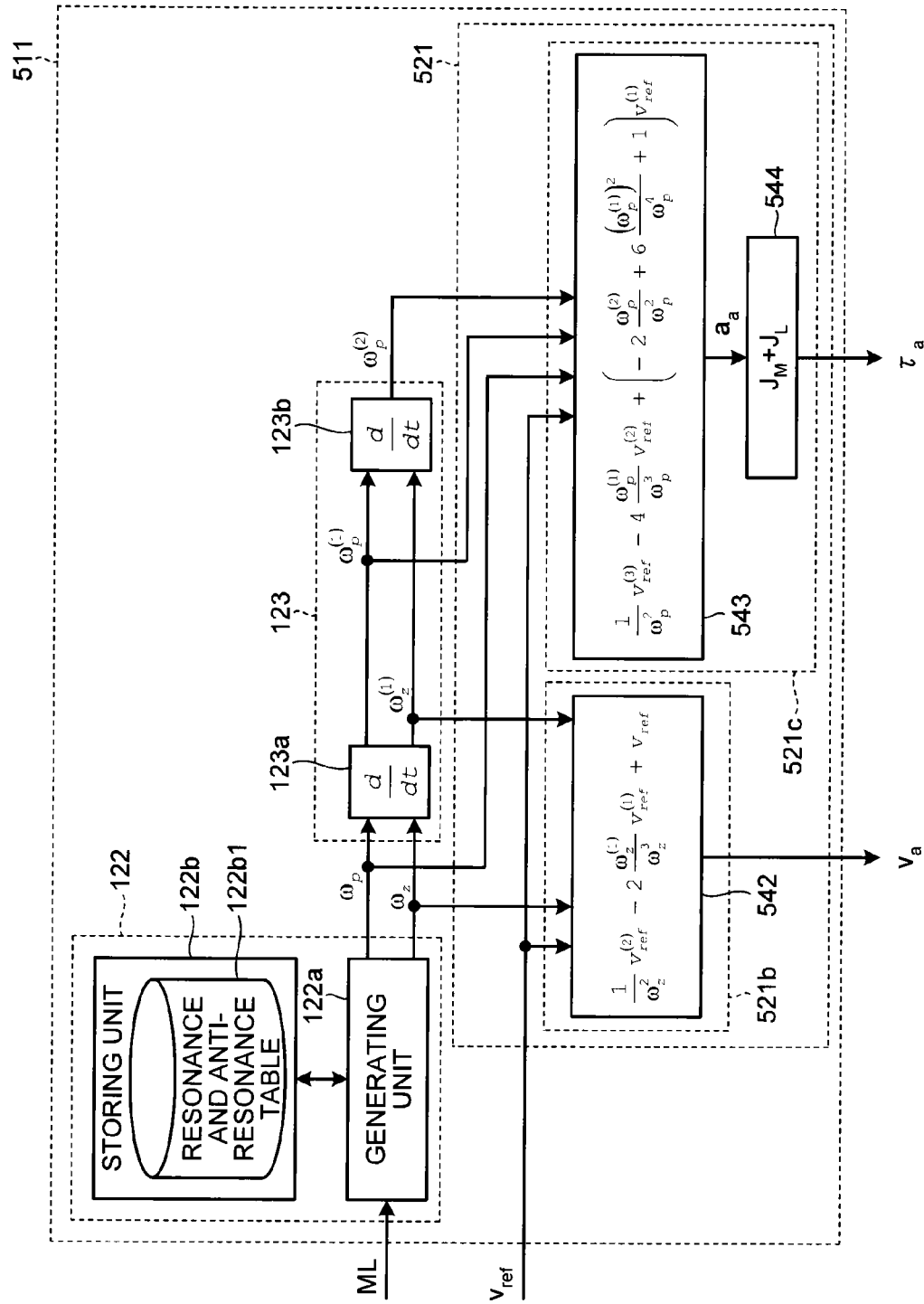
FIG. 11 is a diagram showing the configuration of a feed-forward control unit in the fifth embodiment.

The feed-forward control unit 511 includes a damping filter (a second calculating unit) 521. As shown in FIG. 11, an internal configuration of the damping filter 521 is different from the internal configuration of the damping filter 121 in the first embodiment. FIG. 11 is a block diagram of the internal configuration of the feed-forward control unit 511.

The damping filter 521 does not include the position calculating unit 121a (see FIG. 5) and includes a speed calculating unit 521b and a torque calculating unit 521c.

A model-speed calculating unit 542 of the speed calculating unit 521b receives the motion target value $v_{ref}$ from the outside, receives the anti-resonant frequency $\omega_z$ from the generating unit 122a of the damping-parameter determining unit 122, and receives the first-order differential value $\omega^{(1)}_z$ of the anti-resonant frequency from the differentiator 123a of the damping parameter filter 123. The model-speed calculating unit 542 calculates the model speed $v_a$ as indicated by Formula (24) using the motion target value $v_{ref}$, the anti-resonant frequency $\omega_z$, and the first-order differential value $\omega^{(1)}_z$ of the anti-resonant frequency and outputs the model speed $v_a$ to the feedback control unit 512 (see FIG. 10).

The torque calculating unit 521c includes a model-acceleration calculating unit 543 and an inertia-moment multiplying unit 544.

The model-acceleration calculating unit 543 receives the motion target value $v_{ref}$ from the outside and receives the resonant frequency $\omega_p$ from the generating unit 122a of the damping-parameter determining unit 122. The model-acceleration calculating unit 543 receives the first-order differential value $\omega^{(1)}_p$ of the resonant frequency from the differentiator 123a of the damping parameter filter 123 and receives the second-order differential value $\omega^{(2)}_p$ of the resonant frequency from the differentiator 123b of the damping parameter filter 123. The model-acceleration calculating unit 543 calculates the model acceleration $a_a$ as indicated by Formula (27) below using the motion target value $v_{ref}$, the resonant frequency $\omega_p$, and the first-order differential value $\omega^{(1)}_p$ and the second-order differential value $\omega^{(2)}_p$ of the resonant frequency and outputs the model acceleration $a_a$ to the inertia-moment multiplying unit 544.

The inertia-moment multiplying unit 544 receives the model acceleration $a_a$ from the model-acceleration calculating unit 543. The inertia-moment multiplying unit 544 calculates the model torque $\tau_a$ as indicated by Formula (28) below using the model acceleration $a_a$ and outputs the model torque $\tau_a$ to the torque adder 113 (see FIG. 10).

An operation of the damping filter 521 ((a method of calculating the model position $p_a$, the model speed $v_a$, and the model torque $\tau_a$) is explained in detail.

The model-speed calculating unit 542 calculates, using the anti-resonant frequency $\omega_z$ (the damping parameter signal θ) and the motion target value $v_{ref}$, according to a formula obtained by temporally differentiating Formula (6) and Formula (4), the motor speed $v_M$ at the time when the mechanical speed $v_L$ coincides with the external speed command $v_{ref}$ and outputs a result of the calculation to the feedback control unit 512 as the model speed $v_a$. To explain actually using a formula, the motor speed $v_M$ at the time when the mechanical speed $v_L$ coincides with the external speed command $v_{ref}$ is calculated as follows by differentiating both sides of Formula (4) concerning time taking into account that the anti-resonant frequency $\omega_z$ also changes with time:

$$v_a = 1/\omega_z^2 \times v^{(2)}_{ref} - 2 \times \omega^{(1)}_z / \omega_z^3 \times v^{(1)}_{ref} + v_{ref} \quad (24)$$

Formula (6) is also used. The model-speed calculating unit 542 calculates the model speed $v_a$ using Formula (24). The model-speed calculating unit 542 outputs the calculated model speed $v_a$ to the feedback control unit 512. That is, the model-speed calculating unit 542 outputs, to the feedback control unit 512, as the model speed $v_a$, a value obtained by adding the motion target value $v_{ref}$ to a difference between a value obtained by multiplying a second-order differential value $v^{(2)}_{ref}$ of the motion target value with the reciprocal of the square of the anti-resonant frequency $\omega_z$ and a value obtained by multiplying, with the reciprocal of the cube of the anti-resonant frequency $\omega_z$, a value obtained by doubling a product of the first-order differential value $v^{(1)}_{ref}$ of the motion target value and the first-order differential value $\omega^{(1)}_z$ of the anti-resonant frequency.

The model-acceleration controller 543 and the inertia-moment multiplying unit 544 calculates the model torque $\tau_a$ using the resonant frequency $\omega_p$ (the damping parameter signal θ) and the first-order differential value $\omega^{(1)}_p$ and the second-order differential value $\omega^{(2)}_p$ (the damping parameter variation signal θ') of the resonant frequency $\omega_p$ to set a characteristic from the motion target value $v_{ref}$ to the model torque $\tau_a$ as an inverse characteristic of a dynamic characteristic from the motor torque $\tau_M$ to the mechanical speed $v_L$. The inertia-moment multiplying unit 544 outputs a result of the calculation to the torque adder 113.

By calculating the model torque $\tau_a$ in this way, it is possible to cause the mechanical speed $v_L$ of the control target 1 to follow the motion target value $v_{ref}$ without a deviation if there is no disturbance such as friction and a model error. As a result, it is also possible to suppress vibration. Operations of the model-acceleration calculating unit 543 and the inertia-moment multiplying unit 544 are explained using formulas.

First, calculations of first-order differential and second-order differential of both the sides of Formula (4) is performed taking into account that the resonant frequency $\omega_p$ and the anti-resonant frequency $\omega_z$ also change with time. The calculated formula and Formula (4) are substituted in Formula (3) to calculate a dynamic characteristic from the motor torque $\tau_M$ to the mechanical speed $v_L$. Then, Formula (25) is obtained.

$$1/\omega_p^2 \times v^{(4)}_L - 4 \times \omega^{(1)}_p/\omega_p^3 \times v^{(3)}_L + (-2 \times \omega^{(2)}_p/\omega_p^2 + 6 \times (\omega^{(1)}_p)^2/\omega_p^4) \times v^{(2)}_L + v_L = 1/(J_M + J_L) \times \tau_M \quad (25)$$

If the characteristic from the motion target value $v_{ref}$ to the model torque $\tau_a$ is set as the inverse characteristic of the characteristic from the motor torque $\tau_M$ to the mechanical speed $v_L$, it is possible to cause the mechanical speed of the control target to follow the motion target value $v_{ref}$ without a deviation. Further, because the dynamic characteristic from the motor torque $\tau_M$ to the mechanical speed $v_L$ is Formula (25), the model torque $\tau_M$ is calculated to be Formula (26).

$$\tau_a = (J_M + J_L) \times \{1/\omega_p^2 \times v^{(4)}_{ref} - 4\omega^{(1)}_p/\omega_p^3 \times p^{(3)}_{ref} + (-2 \times \omega^{(2)}_p/\omega_p^2 + 6 \times (\omega^{(1)}_p)^2/\omega_p^4) \times v^{(2)}_{ref} + v^{(2)}_{ref}\} \quad (26)$$

Therefore, the model-acceleration calculating unit 543 calculates the model acceleration $a_a$ according to Formula (27) below using the motion target value $v_{ref}$, the resonant frequency $\omega_p$, and the first-order differential value $\omega^{(1)}_p$ and the second-order differential value $\omega^{(2)}_p$ of the resonant frequency $\omega_p$. The model-acceleration calculating unit 543 outputs the calculated model acceleration $a_a$ to the inertia-moment multiplying unit 544. The inertia-moment multiplying unit 544 calculates the model torque $\tau_a$ according to Formula (28) below using the model acceleration $a_a$ as in the first embodiment. The inertia-moment multiplying unit 544 outputs the calculated model torque $\tau_a$ to the torque adder 113.

$$a_a = 1/\omega_p^2 \times v^{(4)}_{ref} - 4 \times \omega^{(1)}_p/\omega_p^3 \times v^{(3)}_{ref} + (-2 \times \omega^{(2)}_p/\omega_p^2 + 6 \times (\omega^{(1)}_p)^2/\omega_p^4) \times v^{(2)}_{ref} + v^{(2)}_{ref} \quad (27)$$

$$\tau a = (J_M + J_L) \times a_a \quad (28)$$

In this way, the model-acceleration calculating unit 543 calculates the model torque $\tau_a$ using Formula (27) and the inertia-moment multiplying unit 544 calculates the model torque $\tau_a$ using Formula (28). Consequently, when there is no disturbance such as friction and a model error, it is possible to cause the mechanical speed $v_L$ to follow the motion target value $v_{ref}$ without a deviation.

As explained above, according to the fifth embodiment, it is possible to obtain effects equivalent to the effects in the first embodiment in speed control. It is possible to expand uses of the motor control device according to the present invention.

In this embodiment, the motor motion detection value $p_M$ is detected by the detector 2 such as an encoder and the motor speed calculation value $v_M$ is calculated by the speed calculator 133 from the motor motion target value $p_M$. However, the motor speed calculation value $v_M$ can be directly measured using a resolver, a tacho generator, a Hall device, or the like.

An integral value of the motion target value $v_{ref}$ can be regarded as the motion target value $p_{ref}$ concerning a position. The model speed $v_a$ and the model torque $\tau_a$ can be calculated by a calculation method same as the calculation method in the second to fourth embodiments.

INDUSTRIAL APPLICABILITY

As explained above, the motor control device according to the present invention is useful for positioning driving for an industrial machine with low rigidity.

REFERENCE SIGNS LIST 1 control target
1a motor
1a1 x-axis motor
1a2 motor
1a11 z-axis motor
1b spring
1b1 z-axis arm
1b2 rope
1c mechanical load
1c1, 1c2 loads
1d1 x-axis arm
1d2 slider
2 detector
3 detector
4 current controller
100, 200, 300, 400, 500 motor control devices
111, 211, 311, 411, 511 feed-forward control units
112, 512 feedback control units
113 torque adder
121, 221, 321, 421, 521 damping filters
121a position calculating unit
121b, 521b speed calculating units
121c, 221c, 321c, 421c, 521c torque calculating units
122, 222, 322, 422 damping-parameter determining units
122a, 222a, 322a, 422a generating units
122b storing unit
122b1 resonance and anti-resonance table
123 damping parameter filter
123a differentiator
123b differentiator
131 position controller
132 speed controller
133 speed calculator
141, 241, 341, 441 model-position calculating units
142, 542 model-speed calculating units
143, 543 model-acceleration calculating units
144, 244, 344, 444, 544 inertia-moment multiplying units
221a, 321a, 421a compensation-signal generating units
221b, 321b, 421b change-amount calculating units
245, 345, 445 model-position differentiators
246, 446 model-speed differentiators
321d speed calculating unit
347 resonance-compensation-signal calculating unit
348 resonance-compensation-signal differentiator
349 resonance-compensation-signal second-order differentiator
4410 target value differentiator
4411 target value second-order differentiator
4412 model torque subtractor
4413 model-torque compensating unit
4414 model torque adder

The invention claimed is:

1. A motor control device that controls motion of a control target including a motor and a vibratable element, the motor control device comprising:
a generating unit configured to generate, according to state information representing a state of the control target related to a vibration characteristic of the control target, a first parameter representing the vibration characteristic of the control target;
a first calculating unit configured to calculate a second parameter corresponding to a temporal change amount of the first parameter generated by the generating unit;
a second calculating unit configured to calculate, according to a motion target value, the first parameter, and the second parameter, a model torque such that the control target does not excite vibration; and
a developing unit configured to develop, according to the model torque calculated by the second calculating unit, a torque command for the motor for causing the motion of the control target to follow the motion target value.

2. The motor control device according to claim 1, wherein the second calculating unit calculates a model speed, which is speed that the control target can follow without vibrating, using the motion target value, the first parameter, and the second parameter, and the developing unit develops the torque command such that speed of the control target follows the model speed calculated by the second calculating unit.

3. The motor control device according to claim 2, wherein the second calculating unit calculates a model position, which is a position that the control target can follow without vibrating, using the motion target value and the first parameter, and the developing unit develops the torque command for causing a position of the control target to follow the model position calculated by the second calculating unit.

4. The motor control device according to claim 3, wherein the second calculating unit estimates, as the model position, a motor position at time when the position of the control target follows speed corresponding to the motion target value.

5. The motor control device according to claim 2, wherein the second calculating unit estimates, as the model speed, motor speed at time when the speed of the control target follows speed corresponding to the motion target value.

6. The motor control device according to claim 1, wherein the first parameter includes a vibration frequency of the control target, and the second parameter includes a temporal change amount of the vibration frequency of the control target.

7. The motor control device according to claim 1, further comprising a storing unit configured to store a table in which a plurality of values of the state information and a plurality of values of the first parameter are associated, wherein the generating unit generates the first parameter corresponding to the received state information by referring to the table stored in the storing unit.

8. The motor control device according to claim 1, further comprising a second storing unit configured to store a function indicating a relation between a value of the state information and a value of the first parameter, wherein the generating unit generates the first parameter corresponding to the state information input to the generating unit by referring to the function stored in the second storing unit.

9. The motor control device according to claim 1, wherein, when n is an integer larger than 1, the first calculating unit calculates the second parameter by performing n-th order differential or n-th order difference processing.

10. The motor control device according to claim 1, wherein the control target includes a plurality of the motors, and the state information received by the generating unit includes a state of the vibratable element corresponding to a position of a motor not controlled by the motor control device among the motors.

11. The motor control device according to claim 1, wherein the second calculating unit calculates, based on an inverse characteristic of a dynamic characteristic from the torque command to a position of the control target, the torque command necessary for causing the position of the control target to follow the motion target value and calculates the model torque according to a result of the calculation.

12. A motor control device that controls motion of a control target including a motor and a vibratable element, the motor control device comprising:

a generating unit configured to generate, according to state information representing a state of the control target related to a vibration characteristic of the control target, a first parameter representing the vibration characteristic of the control target;

a second generating unit configured to generate a model position and a resonant frequency compensation signal, the model position being obtained by removing an anti-resonant frequency component corresponding to the first parameter from a motion target value, the resonant frequency composition signal being obtained by removing a resonant frequency component corresponding to the first parameter from the motion target value;

a torque calculating unit configured to generate a model torque by temporarily second-order-differentiate the resonant frequency compensation signal generated by the second generating unit;

a speed calculating unit configured to generate a model speed by temporarily differentiating the model position generated by the second generating unit; and a developing unit configured to develop a torque command for the motor according to the model torque calculated by the torque calculating unit such that speed of the control target follows the model speed generated by the speed calculating unit.

13. A motor control device that controls motion of a control target including a motor and a vibratable element, the motor control device comprising:

a generating unit configured to generate, according to state information representing a state of the control target related to a vibration characteristic of the control target, a first parameter representing the vibration characteristic of the control target;

a second generating unit configured to generate a model position obtained by removing an anti-resonant frequency component corresponding to the first parameter from a motion target value;

a torque calculating unit configured to generate a model torque, based on a first value obtained by temporarily second-order-differentiate the motion target value, a second value obtained by temporarily second-order-differentiate the model position generated by the second generating unit, the anti-resonant frequency component corresponding to the first parameter, and a resonant frequency component corresponding to the first parameter;

a speed calculating unit configured to generate a model speed by temporarily differentiating the model position generated by the second generating unit; and a developing unit configured to develop a torque command for the motor according to the model torque calculated by the torque calculating unit, such that speed of the control target follows the model speed generated by the speed calculating unit.

14. The motor control device according to claim 13, wherein the torque calculating unit generates the model torque by subtracting the first value from the second value, multiplying a result of the subtraction by a square of the anti-resonant frequency, dividing a result of the multiplication by a square of the resonant frequency, and adding the first value to a result of the division.

* * * * *